United States Patent
Xu et al.

(10) Patent No.: US 12,349,215 B2
(45) Date of Patent: Jul. 1, 2025

(54) METHOD AND EQUIPMENT FOR HANDOVER

(71) Applicant: Samsung Electronics Co., Ltd., Suwon-si (KR)

(72) Inventors: Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 18/308,986

(22) Filed: Apr. 28, 2023

(65) Prior Publication Data
US 2023/0262555 A1    Aug. 17, 2023

Related U.S. Application Data

(63) Continuation of application No. 17/535,876, filed on Nov. 26, 2021, now Pat. No. 11,696,199, which is a
(Continued)

(30) Foreign Application Priority Data

| Dec. 3, 2018 | (CN) | 201811467666.2 |
| Jan. 30, 2019 | (CN) | 201910094153.X |
| Mar. 28, 2019 | (CN) | 201910245257.6 |

(51) Int. Cl.
*H04W 76/00* (2018.01)
*H04W 8/08* (2009.01)
(Continued)

(52) U.S. Cl.
CPC ............. *H04W 76/12* (2018.02); *H04W 8/08* (2013.01); *H04W 28/0268* (2013.01);
(Continued)

(58) Field of Classification Search
CPC ....... H04W 76/11; H04W 76/12; H04W 8/08; H04W 28/0268; H04W 48/16; H04W 80/10; H04W 36/00222
See application file for complete search history.

(56) References Cited

U.S. PATENT DOCUMENTS 10,812,629 B2    10/2020    Park et al.
10,959,133 B2    3/2021    Wang et al.
(Continued)

FOREIGN PATENT DOCUMENTS

| CN | 101600238 A | 12/2009 |
| CN | 101998353 A | 3/2011 |

(Continued)

OTHER PUBLICATIONS

Chinese Office Action dated Apr. 26, 2023, issued in Chinese Application No. 2019102452576.
(Continued)

*Primary Examiner* — Khai M Nguyen
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method and equipment for handover are provided. The method includes informing, by a source base station, a source core network whether a direct data forwarding path is available, determining, by the source core network, whether to use direct data forwarding or indirect data forwarding, informing, by the source core network, a
(Continued)

target core network of information of direct data forwarding, indirect data forwarding or data forwarding being not possible, informing, by the target core network, a target base station of the information of direct data forwarding, indirect data forwarding or data forwarding being not possible, and allocating, by the target base station, tunnel information for data forwarding.

20 Claims, 10 Drawing Sheets

Related U.S. Application Data continuation of application No. 16/701,635, filed on Dec. 3, 2019, now Pat. No. 11,206,591.

(51) Int. Cl.
*H04W 28/02* (2009.01)
*H04W 48/16* (2009.01)
*H04W 76/11* (2018.01)
*H04W 76/12* (2018.01)
*H04W 80/10* (2009.01)
*H04W 36/00* (2009.01)

(52) U.S. Cl.
CPC ............ *H04W 48/16* (2013.01); *H04W 76/11* (2018.02); *H04W 80/10* (2013.01); *H04W 36/00222* (2023.05)

(56) References Cited

U.S. PATENT DOCUMENTS

| | | | |
|---|---|---|---|
| 11,206,591 | B2 | 12/2021 | Xu et al. |
| 11,356,903 | B2* | 6/2022 | Wu .................. H04W 36/0058 |
| 12,245,311 | B2* | 3/2025 | Zhu ....................... H04W 76/11 |
| 2012/0142278 | A1 | 6/2012 | Wang et al. |
| 2016/0007255 | A1 | 1/2016 | Sharma et al. |
| 2016/0088540 | A1 | 3/2016 | Wang et al. |
| 2016/0373975 | A1 | 12/2016 | Xu et al. |
| 2018/0279193 | A1 | 9/2018 | Park et al. |
| 2018/0324646 | A1* | 11/2018 | Lee ................... H04W 36/0011 |
| 2019/0058997 | A1* | 2/2019 | Futaki ............... H04W 36/1443 |
| 2019/0098536 | A1 | 3/2019 | Qiao et al. |
| 2019/0182737 | A1 | 6/2019 | Futaki et al. |
| 2019/0313295 | A1 | 10/2019 | Xu et al. |
| 2020/0008109 | A1* | 1/2020 | Li ........................... H04W 8/08 |
| 2020/0154320 | A1 | 5/2020 | Xu et al. |
| 2020/0322851 | A1* | 10/2020 | Sun .................... H04W 36/0016 |
| 2021/0076250 | A1* | 3/2021 | Wang ................. H04W 28/0221 |
| 2021/0289402 | A1* | 9/2021 | Ke .................... H04W 36/0066 |
| 2024/0306255 | A1* | 9/2024 | Yang .................... H04W 80/10 |

FOREIGN PATENT DOCUMENTS

| | | | | |
|---|---|---|---|---|
| CN | 108282832 | A | 7/2018 | |
| CN | 108811016 | A | 11/2018 | |
| CN | 110249646 | B | 1/2023 | |
| EP | 2 996 388 | A1 | 3/2016 | |
| KR | 10-2016-0114631 | A | 10/2016 | |
| WO | WO-2018203734 | A1 * | 11/2018 | ............ H04W 28/02 |
| WO | WO-2019097498 | A1 * | 5/2019 | |

OTHER PUBLICATIONS

Chinese Office Action with English translation dated Mar. 8, 2024; Chinese Appln. No. 201910245257.6.
Chinese Office Action with English translation dated Oct. 30, 2023; Chinese Appln. No. 201910245257.6.
European Search Report dated Jan. 3, 2024; European Appln. No. 19 892 662.8-1216.
International Search Report dated Mar. 6, 2020, issued in International Application No. PCT/KR2019/016936.
3GPP; TSG SA; Security architecture and procedures for 5G system; Stage 2 (Release 15), 3GPP TS 23.502 V15.3.0, section 4.11.1.2.2.2; and figure 4.11.1.2.2.2-1, Sep. 17, 2018.
Samsung, Direct Data forwarding for inter-system HO, R3-191570, 3GPP TSG-RAN WG3#103bis, China Apr. 8-12, 2019.
European Search Report dated Jan. 19, 2022, issued in European Application No. 19892662.8.
Indian Office Action dated Nov. 24, 2022, issued in Indian Application No. 202137024722.

* cited by examiner

METHOD AND EQUIPMENT FOR HANDOVER

CROSS-REFERENCE TO RELATED APPLICATION(S)

This application is a continuation application of prior application Ser. No. 17/535,876, filed on Nov. 26, 2021, which application is a continuation application of prior application Ser. No. 16/701,635, filed on Dec. 3, 2019, which has issued as U.S. Pat. No. 11,206,591 on Dec. 21, 2021 and is based on and claims priority under 35 U.S.C. § 119(a) of a Chinese patent application number 201811467666.2, filed on Dec. 3, 2018, in the Chinese National Intellectual Property Administration, and of a Chinese patent application number 201910094153.X, filed on Jan. 30, 2019, in the Chinese National Intellectual Property Administration, and of a Chinese patent application number 201910245257.6, filed on Mar. 28, 2019, in the Chinese National Intellectual Property Administration, the disclosure of each of which is incorporated by reference herein in its entirety.

BACKGROUND

1. Field

The disclosure relates to wireless communication technologies. More particularly, the disclosure relates to a method and equipment for handover.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Modern mobile communications increasingly tend to focus on multimedia services that provide users with high-rate transmission. FIG. 1 is a system architecture diagram showing System Architecture Evolution (SAE) according to the related art.

Referring to FIG. 2, a User Equipment (UE) 101 is a terminal equipment for receiving data. An Evolved Universal Terrestrial Radio Access Network (E-UTRAN) 102 is a radio access network in which a macro eNodeB/NodeB providing the UE with an interface for accessing the radio network is included. A Mobility Management Entity (MME) 103 is responsible for managing a mobility context, a session context and security information for the UE. A Serving Gateway (SGW) 104 mainly functions to provide a user plane, and the MME 103 and the SGW 104 may be in a same physical entity. A Packet Data Network Gateway (PGW) 105 is responsible for charging, lawful interception or more, and the PGW 105 and the SGW 104 may also be in a same physical entity. A Policy and Charging Rules Function Entity (PCRF) 106 provides Quality of Service (QoS) policy and charging rules. A Serving GPRS Support Node (SGSN) 108 is a network node device providing routing for data transmission in a Universal Mobile Telecommunication System (UMTS). A Home Subscriber Server (HSS) 109 is a home ownership subsystem of the UE, and is responsible for protecting user information comprising the current location of the UE, the address of a serving node, user security information, a packet data context of the UE, or more.

FIG. 2 shows an overall architecture of 5th generation (5G).

Referring to FIG. 2, a User Equipment (UE) 201 is a terminal equipment for receiving data according to the related art.

A Next Generation Radio Access Network (NG-RAN) 202 is a radio access network in which a base station providing the UE with an interface for accessing the radio network is included. The base station may be a gNB or an eNB connected to 5G core (5GC), and the eNB connected to 5GC may also be called an ng-eNB. An Access Control and Mobility Management Function Entity (AMF) 203 is responsible for managing a mobility context and security information for the UE. A User Plane Function Entity (UPF) 204 mainly provides a user plane function. A Session Management Function Entity (SMF) 205 is responsible for session management. A Data Network (DN) 206 contains operator services, the access to Internet, third-party services or more.

The interface between the NG-RAN and the AMF is NG-C or N2, and the interface between the NG-RAN and the UPF is NG-U or N3.

In the next generation network deployment, there is a scenario in which the LTE network and the 5G network coexist. When a UE moves in a boundary between the E-UTRAN and the NG-RAN, technologies for realizing a handover between different radio access technologies (inter-Radio Access Technology (RAT) handover) are required in order to ensure the continuity of services. There are two different schemes for data forwarding during the handover between two systems, since there is a concept of Evolved Packet System (EPS) bearers in an EPS system but no concept of EPS bearers in a 5G System (5GS).

One scheme is a method of using one data forwarding tunnel for each Protocol Data Unit (PDU) session between the NG-RAN node and the UPF. For the handover from 5G to 4G, the UPF sends the data flow of different QoS flows received from each PDU session tunnel to the corresponding Evolved Radio Access Bearer (E-RAB) tunnel and sends it to the SGW, and the SGW forwards it to the eNB. For the handover from 4G to 5G, the UPF sends the data received from each E-RAB tunnel to the corresponding PDU session tunnel, and the data is sent by the UPF to the NG-RAN node.

The other scheme is to establish a data tunnel of each E-RAB between the NG-RAN node and the UPF, so that the data forwarding between the NG-RAN node and the eNB is performed through each E-RAB tunnel between the NG-RAN and the UPF, between the UPF and the SGW, and between the SGW and the eNB. This data forwarding method may also forwards data directly between the NG-RAN node and the eNB without using the core network.

If these two data forwarding methods are adopted at the same time, how to ensure the coexistence and interoperability of the two data forwarding methods in the network has not been discussed yet.

In the handover process of the EPS and the 5GS, the allocation of data forwarding tunnels and the execution of data forwarding involve to NG-RAN node, SMF, UPF, SGW, and eNB. If there are two different data forwarding methods at the same time, the interoperability between different nodes is a problem to be solved, and if one equipment and another equipment support different data forwarding methods, this will result in the failure of data forwarding, especially when the above equipment is from different vendors.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and equipment for supporting handover in view of the deficiencies of conventional approaches.

Additional aspects will be set forth in part in the description which follows and, in part, will be apparent from the description, or may be learned by practice of the presented embodiments.

In accordance with an aspect of the disclosure, a method for supporting handover is provided. The method includes the operations of informing, by a source base station, a source core network whether a direct data forwarding path is available, determining, by the source core network, whether to use direct data forwarding or indirect data forwarding, informing, by the source core network, a target core network of information of direct data forwarding, indirect data forwarding or data forwarding being not possible, informing, by the target core network, a target base station of the information of direct data forwarding, indirect data forwarding or data forwarding being not possible, and allocating, by the target base station, tunnel information for data forwarding.

Specifically, the target base station allocates a corresponding data forwarding tunnel according to whether it is direct data forwarding or indirect data forwarding. if it is direct data forwarding, the target base station allocates downlink data forwarding tunnel information for the mapped E-RAB, for the QoS flows for which the target base station accepts data forwarding or the E-RAB for which the target base station accepts data forwarding, if it is indirect data forwarding, the target base station allocates downlink data forwarding tunnel information for the PDU session to which the QoS flow belongs, for a QoS flow for which the target base station accepts data forwarding.

Specifically, the method further includes the operation of sending, by the target bases station, the allocated data forwarding tunnel information to the target core network.

In accordance with another aspect of the disclosure a method for supporting handover is provided The method includes the following operations of sending, by a source base station, a source base station identifier to a source core network, sending, by the source core network, the source base station identifier to a target core network, sending, by the target core network, the source base station identifier to a target base station, and determining, by the target base station, whether direct data forwarding is available, and allocating, by the target base station, a corresponding data forwarding tunnel.

Specifically, the method further includes the operation of sending, by the target base station, information of direct data forwarding being available to the target core network.

Specifically, the method further includes the operation of sending, by the target core network, information of direct data forwarding being available to the source core network.

In accordance with another aspect of disclosure, a method for supporting handover is provided. The method includes the following operations of sending, by a source base station, a data forwarding manner support by the source base station to a source core network, and allocating, by the source core network, data forwarding tunnel information according the data forwarding manner support by the source base station.

Specifically, the data forwarding manner comprises data forwarding of a PDU session tunnel and/or data forwarding of an E-RAB tunnel.

In accordance with another aspect of the disclosure, a method for supporting handover is provided. The method includes the following operations of sending, by a UPF, a data forwarding manner support by the UPF to an SMF, sending, by the SMF, the data forwarding manner support by the UPF to an AMF, sending, by the AMF, the data forwarding manner support by the UPF to a target NG-RAN node, and allocating, by the NG-RAN node, data forwarding tunnel information according the data forwarding manner support by the UPF.

Specifically, the data forwarding manner comprises data forwarding of a PDU session tunnel and/or data forwarding of an E-RAB tunnel.

The methods for supporting handover in the present application, may solve the above problems, such that the problem of coexistence of different data forwarding methods when the UE moves between the EPS and the 5GS system is completely solved, thereby avoiding data loss, ensuring service continuity and interoperability of different equipment from different vendors, and reducing configuration by an operator.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
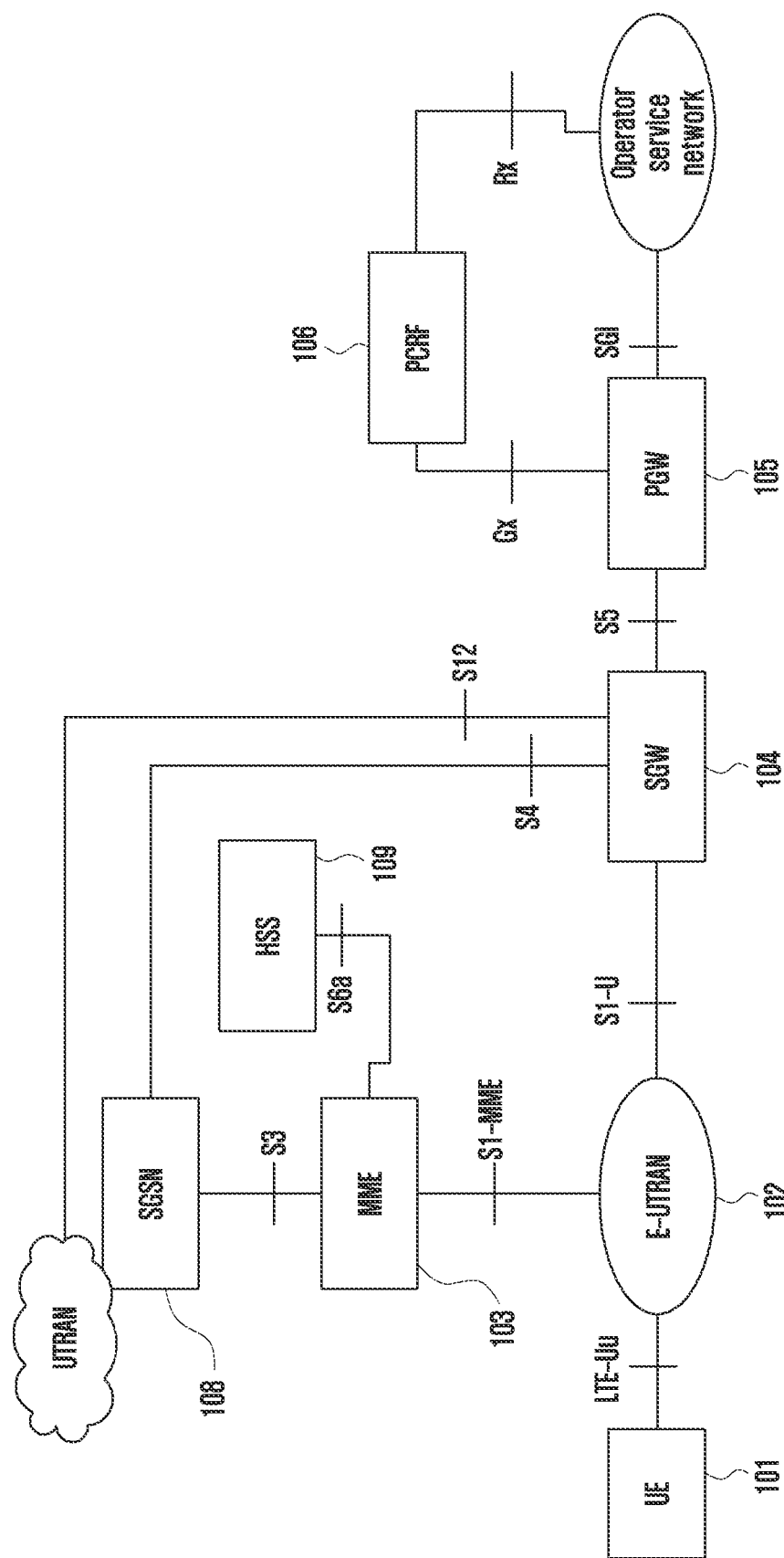
FIG. 1 is a system architecture diagram showing a System Architecture Evolution (SAE) according to the related art.
Figure 2:
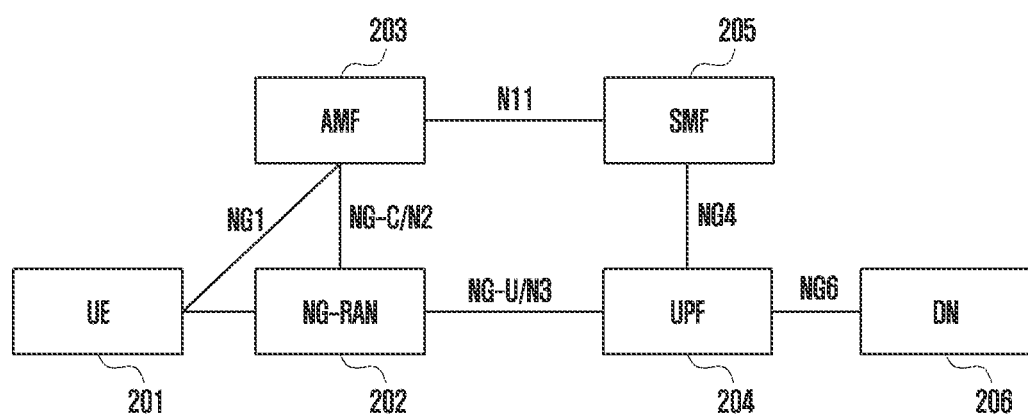
FIG. 2 shows a schematic diagram of an initial overall architecture of 5G according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood by one person of ordinary skill in the art that singular forms "a", "an", "the", and "said" may be intended to include plural forms as well, unless otherwise stated. It should be further understood that terms "include/including" used in this specification specify the presence of the stated features, integers, operations, elements and/or components, but not exclusive of the presence or addition of one or more other features, integers, operations, elements, components, and/or combinations thereof. It should be understood that, when an element is referred to as being "connected to" or "coupled to" another element, it may be directly connected or coupled to other elements or provided with intervening elements therebetween. In addition, "connected to" or "coupled to" as used herein may include wireless connection or coupling. As used herein, the term "and/or" includes all or any of one or more associated listed items or combinations thereof.

Those skilled in the art will appreciate that all terms (including technical terms and scientific terms) used herein have the same meaning as commonly understood by one of ordinary skill in the art belonging to the field of the art, unless otherwise defined. It should also be understood that those terms, such as those defined in a general dictionary, should be understood as having a meaning consistent with the meaning in the context of the prior art, and it is not intended to be construed in an idealized or overly formal sense unless specifically defined herein.

Those skilled in the art may understand that the "terminal" and "terminal equipment" as used herein include both a wireless signal receiver device only having a wireless signal receiver without a transmitting capability, and a receiving and transmitting hardware having a device capable of receiving and transmitting hardware for two-way communication over a two-way communication link. Such device may include: a cellular or other communication device having a single line display or a multi-line display, or a cellular or other communication device without a multi-line display; a PCS (Personal Communications Service), which may combine voice, data processing, fax and/or data communication capabilities; a PDA (Personal Digital Assistant), which may include a radio frequency receiver, a pager, Internet/Intranet access, a web browser, a notepad, a calendar, and/or a GPS (Global Positioning System) receiver; a laptop and/or a palmtop computer or other devices having and/or including a radio frequency receiver. As used herein, "terminal" and "terminal equipment" may be portable, transportable, installed in a vehicle (in aviation, sea and/or land), or adapted and/or configured to operate locally, and/or operated in any other position on the earth and/or space in a distributed form. As used herein, "terminal" and "terminal equipment" may also be a communication terminal, an internet terminal, and a music/video playing terminal, for example, a PDA, a MID (Mobile Internet Device), and/or a mobile phone having a music/video playback function, and may also be a smart TV, a set-top box and other devices.

In the process of UE handover between EPS and 5GS, there are three manners to coexist two data forwarding methods:

Manner 1: the first method is used for indirect data forwarding, that is, a method of using one data forwarding tunnel for each PDU session between the NG-RAN node and the UPF is used; and the second method is used for direct data forwarding, that is, direct data forwarding is performed between the NG-RAN node and the eNB through a E-RAB tunnel.

Manner 2: when to use which data forwarding method is not limited in the standard, and which data forwarding method is supported depends on the implementation of an equipment vendor.

Manner 3: both data forwarding methods must be supported.

Direct data forwarding may be performed only when the eNB and the NG-RAN node have a direct path or a secure connection. Corresponding to the foregoing manner 1, in the process of handover from EPS to 5GS, if it is direct data forwarding, the target NG-RAN node needs to allocate data forwarding tunnel information for the E-RAB corresponding to the QoS flow for which the target base station accepts data forwarding, and the information is included in the handover request acknowledgement message; if it is indirect data forwarding, the target NG-RAN node needs to allocate data forwarding tunnel information for the PDU session to which the QoS flow for which the target base station accepts data forwarding belongs, and the information is included in the handover request acknowledgement message. However, in conventional approaches, the NG-RAN node does not know whether there is a direct path or a secure connection between the eNB and the NG-RAN node.

In the process of handover from EPS to 5GS, if it is direct data forwarding, the AMF sends the tunnel for each E-RAB allocated by the target NG-RAN node to the MME, and sends it to the source eNB through the MME; if it is indirect data forwarding, the AMF needs to send the data forwarding tunnel information for each PDU session allocated by the target NG-RAN node to the UPF through the SMF, and the SMF or the UPF allocates a data forwarding tunnel for each E-RAB used for data forwarding from SGW to UPF. It may be seen that for the two data forwarding methods, the behaviors of the UPF are different, but the UPF does not know whether the eNB and the NG-RAN node have a direct path or a secure connection, so the UPF does not know whether to allocate a data forwarding tunnel.

Figure 3:
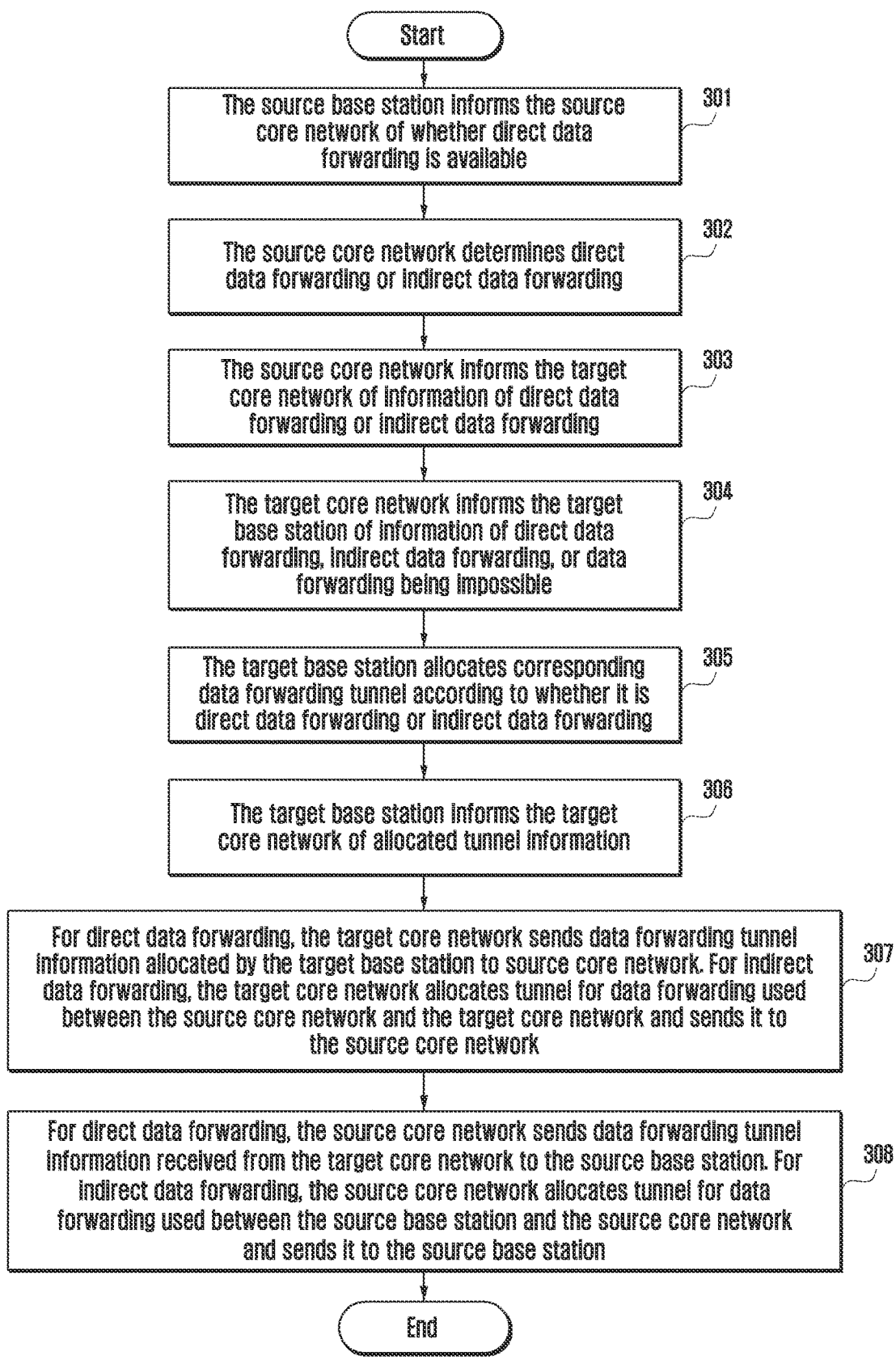
FIG. 3 shows a schematic diagram of a first method for supporting handover according to an embodiment of the disclosure.

The first method for supporting handover according to the present application is shown in FIG. 3.

FIG. 3 shows a schematic diagram of a first method for supporting handover according to an embodiment of the disclosure.

Referring to FIG. 3, the method solves the above two problems, such that data forwarding in the handover process between different systems is successfully performed. Detailed descriptions of operations unrelated to the present embodiment are omitted herein. The method includes the operations of:

Operation 301: the source base station informs the source core network of whether a direct data forwarding path is available. The source base station may determine whether direct data forwarding path is available based on whether there is a direct interface or a security connection between the source base station and the target base station. The source base station may also determine whether direct data forwarding is available in consideration of other factors, without affecting the main concept of the application. The source base station informs the source core network of whether direct data forwarding path is available by a handover required message.

The source base station proposes downlink data forwarding. The downlink data forwarding proposed by the source base station is per Evolved Radio Access Bearer (E-RAB).

Operation 302: the source core network determines direct data forwarding or indirect data forwarding. The core network determines direct data forwarding or indirect data forwarding based on information on whether direct data forwarding path is available, which is received from the source base station. If direct data forwarding is unavailable, the source core network determines whether indirect data forwarding is feasible. If both direct data forwarding and indirect data forwarding are not feasible, data forwarding is not possible.

Operation 303: the source core network informs the target core network of information of direct data forwarding or indirect data forwarding. The source core network may also inform the target core network of information that data forwarding is not possible.

Operation 304: the target core network informs the target base station of information of direct data forwarding, indirect data forwarding, or data forwarding being not possible. The target core network informs, through a handover request message, the target base station of direct data forwarding or indirect data forwarding or data forwarding being not possible.

Operation 305: the target base station allocates tunnel information for data forwarding. If the target base station accepts the downlink data forwarding proposed by the source base station, the target base station allocates tunnel information for downlink data forwarding. The target base station allocates a corresponding data forwarding tunnel according to whether it is direct data forwarding or indirect data forwarding. If it is direct data forwarding, target base station allocates downlink data forwarding tunnel information for the mapped E-RAB, for the QoS flows for which the target base station accepts data forwarding or the E-RAB for which the target base station accepts data forwarding. If it is indirect data forwarding, the target base station allocates downlink data forwarding tunnel information to the PDU session to which the QoS flow belongs, for a QoS flow for which the target base station accepts data forwarding. If data forwarding is not feasible, the target base station does not need to allocate data forwarding tunnel information.

The target base station knows whether it is direct data forwarding or indirect data forwarding based on the handover request message received from the target core network.

Operation 306: the target bases station sends the allocated data forwarding tunnel information to the target core network. For different data forwarding methods in operation 305, the data forwarding tunnel information may be for each PDU session or for each E-RAB. The data forwarding tunnel information includes downlink data forwarding tunnel information and/or uplink data forwarding tunnel information.

Operation 307: for direct data forwarding, the target core network sends the data forwarding tunnel information allocated by the target base station to the source core network. For indirect data forwarding, the target core network allocates the data forwarding tunnel information used between the source core network and the target core network and sends it to the source core network.

Operation 308: for direct data forwarding, the source core network sends the data forwarding tunnel information received from the target core network to the source base station. For indirect data forwarding, the source core network allocates data forwarding tunnel information used between the source base station and the source core network and sends it to the source base station.

The source base station forwards the data according to the received data forwarding tunnel information. The target base station receives the forwarded data. The target base station first sends the forwarded data to the UE, and then sends new data received from the target core network.

As such, the description of the first handover method of the application is completed, and the problem of coexistence of different data forwarding methods when the UE moves between the EPS and the 5GS system is completely solved by the method, thereby avoiding data loss, ensuring service continuity and interoperability of different equipment from different vendors, and reducing configuration by an operator.

Figure 4:
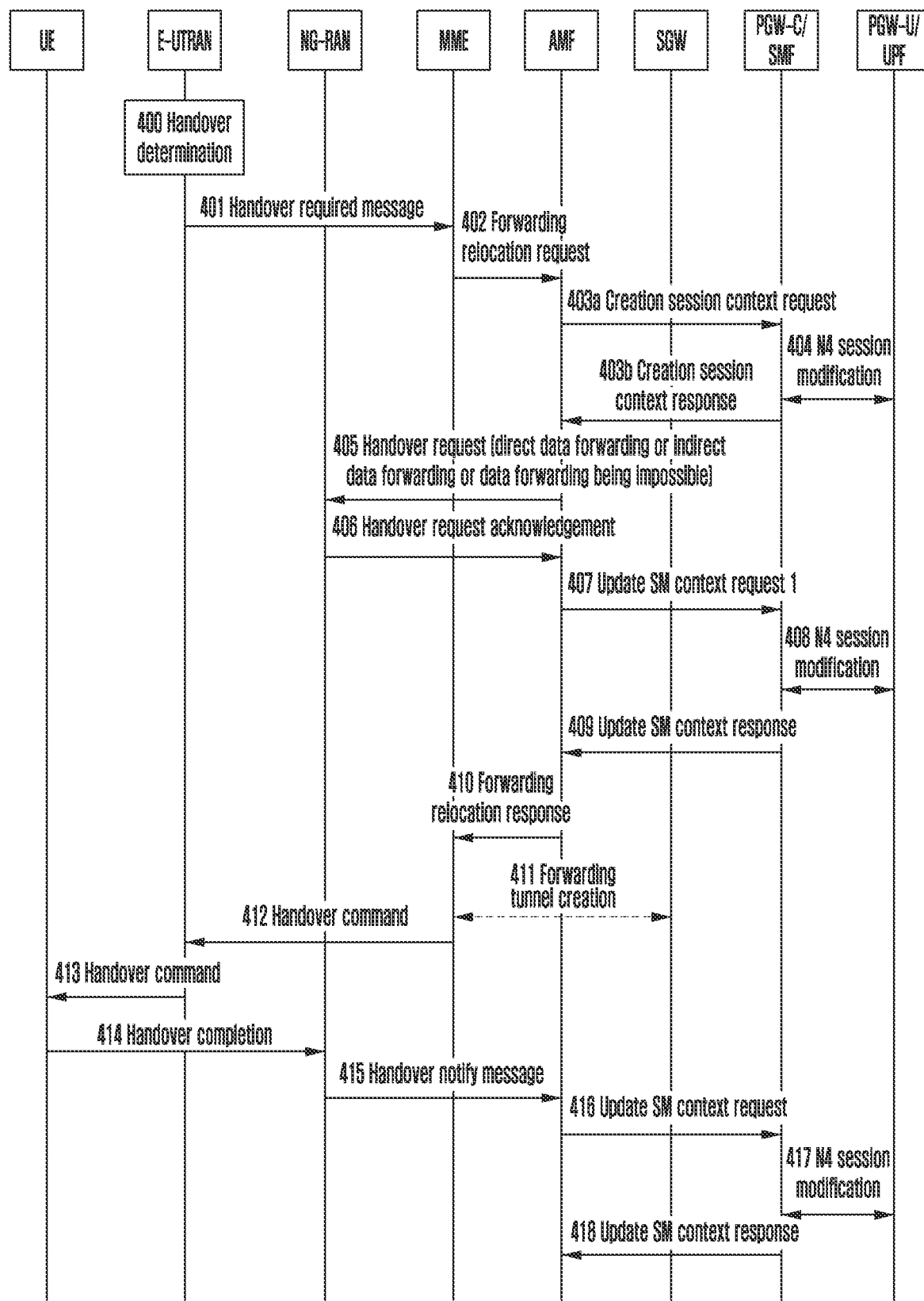
FIG. 4 shows a schematic diagram of a first embodiment of a first method for supporting handover according to an embodiment of the disclosure.

The first embodiment of the first method for supporting handover in the application is shown in FIG. 4.

FIG. 4 shows a schematic diagram of a first embodiment of a first method for supporting handover according to an embodiment of the disclosure.

Referring to FIG. 4, in the method, the SMF or the AMF sends the information of whether it is direct data forwarding or indirect data forwarding to the target base station, so that the target base station determines how to allocate the data forwarding tunnel information. The method solves the above two problems, so that data forwarding in the handover process is successfully performed, and different entities in the network work in coordination to ensure successful data forwarding. Detailed descriptions of operations unrelated to the embodiment are omitted herein. This embodiment is for the handover from EPS to 5GS, including the operations:

Operation 400: the E-UTRAN determines to hand over a UE to an NG-RAN.

Here, the E-UTRAN may be an eNB connected to the EPC. The NG-RAN may be a gNB, or a central unit (CU) in the eNB or gNB connected to the 5GC. The eNB connected to the 5GC may also be referred to as an ng-eNB.

The user plane path before handover is PGW-U+UPF (the UPF having the function of the PGW user plane, hereinafter referred to as UPF), the SGW to the E-UTRAN. The SGW needs to support the interface to connect with PGW-U+UPF. The UE has one or more PDU sessions in progress. Each PDU session includes one or more EPS bearers. In a PDU session establishment process or an EPS bearer establishment process, the mapped QoS information and/or the QoS flow identifier of the QoS flow are allocated for the EPS bearer. The default EPS bearer is mapped to a non-guaranteed business rate (non-GBR) QoS flow. The QoS information and/or the QoS flow identifier of the QoS flow mapped to the EPS bearer may be allocated by the function of the PCC or the PGW control plane. In order to support handover between different systems, the function of the PGW control plane may further have an SMF function. In the scene of deploying the PCC, the policy control and charging rules function (PCRF) provides the QoS information and/or QoS flow identifier of the QoS flow mapped to the EPS bearer to the SMF. In order to support handover between different systems, the PCRF may also have a policy control function (PCF). The SMF sends the QoS information and/or QoS identifier of the QoS flow mapped to the EPS bearer to the UE through the MME, for example, sending them to the UE through a non-access layer message PDN connection establishment message. During the PDU session establishment process or the EPS bearer establishment process, the SMF may also send the QoS information and/or QoS flow identifier of the QoS flow mapped to the EPS bearer to the E-UTRAN through the MME. The E-UTRAN may send the mapping information to the UE through an RRC message. The E-RAB and EPS bearer identifiers are the same or one-to-one correspondence, which are referred to as an EPS bearer in the core network, and are referred to as an E-RAB in the access network. The E-RAB identifier and the EPS bearer identifier are the same or one-to-one correspondence, which are referred to as an EPS bearer identifier in the core network, and are referred to as an E-RAB identifier in the access network.

Operation 401: the E-UTRAN sends a handover required message to the MME. The message includes the identifier of the target NG-RAN node, and a source-to-target transparent container. The message also includes identifier information indicating the AMF to which the target NG-RAN node is connected. The identifier information may be a tracking area identifier, a network sharding identifier, an AMF pool identifier, an AMF identifier or the like.

The message includes information of direct data forwarding path availability.

The source-to-target transparent container includes a PDU session identifier, an identifier of the QoS flow in the PDU session, and the downlink data forwarding proposed for the QoS flow. The eNB obtains the PDU session identifier corresponding to the EPS bearer and/or the QoS flow identifier in the PDU session through the PDN connection establishment process or through the handover process. It is also possible to obtain the QoS information of the mapped QoS flow. The eNB determines whether to propose data forwarding according to the E-RAB to PDU session or according to the mapping of the QoS flow in the E-RAB to the PDU session and the QoS information, and the eNB may consider other factors such as whether there is buffered data to determine whether to propose data forwarding, without affecting the main content of the application.

Operation 402: the MME sends a forward relocation request message to the AMF. The MME selects and finds the AMF according to the identifier information of the AMF to which the target NG-RAN node is connected, which the information is included in the handover required message. The message includes the identifier of the target NG-RAN node, the source-to-target transparent container and the UE context information. The UE context information includes UE mobile management (MM) context information and a session management context. The message includes the handover type.

The MME sends a direct forwarding indication to the AMF. The direct forwarding indication may indicate direct data forwarding or indirect data forwarding. If the MME doesn't receives direct data forwarding path availability from the source E-UTRAN, the MME determines whether indirect data forwarding is possible. The MME informs the AMF of the information of whether direct data forwarding or indirect data forwarding. The MME may also inform AMF of the information of data forwarding being not possible. Data forwarding being not possible means that both direct data forwarding and indirect data forwarding are not possible. Alternatively, the MME may also inform the AMF of the information of direct data forwarding path availability.

Operation 403a: the AMF sends a creation session (SM) context request message to the SMF. The AMF converts the received EPS UE context into a 5GS UE context. The AMF may also exchange with the PCRF to obtain the converted 5GS UE context. The AMF selects the SMF that serves the UE.

According to the information received in the forward relocation request message, the AMF knows that the handover is a handover between different systems, and the AMF requests the SMF to provide the SM context. The AMF sends the message to each SMF serving the UE.

The AMF sends the direct forwarding indication to the SMF. The direct forwarding indication may indicate direct data forwarding or indirect data forwarding. The AMF informs the SMF the information that direct data forwarding or indirect data forwarding is available.

Operation 404: the SMF initiates an N4 session modification process between it and the UPF.

Operation 403b: the SMF sends a creation session context response message to the AMF. The message includes the SM context of the UE. The SM context also includes a mapping relationship between an EPS bearer and a QoS flow in the PDU session. If the SMF has the mapped EPS bearer context, the SMF always feeds back the mapped EPS bearer context together with the SM context to the AMF at the same time when the AMF requests the SM context. Alternatively, the SMF sends the mapped EPS bearer context to the AMF when the AMF requests the mapped EPS context at the same time.

The 5GS UE context includes QoS information in the 5G system. The QoS information in the 5G system includes a QoS rule and/or a QoS profile. The AMF may map EPS QoS information into 5G QoS information, or the AMF interacts with the 5G policy control function (5G-PCF) to derive 5G QoS information.

The SMF determines direct data forwarding, indirect data forwarding, or data forwarding not possible. If the direct forwarding indication received by the SMF indicates that direct data forwarding is available, the SMF determines to use direct data forwarding. If the direct forwarding indication received by the SMF indicates indirect data forwarding and that indirect data forwarding is possible, the SMF determines to use indirect data forwarding. If the direct forwarding indication received by the SMF indicates indirect data forwarding but no indirect data forwarding connectivity between source and target, the SMF determines that data forwarding is not possible. The SMF includes information of direct data forwarding, indirect data forwarding, or data forwarding being not possible in the N2 session management (SM) information container. Direct data forwarding information may be information of direct data forwarding path availability. Data forwarding being not possible means that indirect data forwarding is not possible or both direct and indirect data forwarding are not possible.

Operation 405: the AMF sends the handover request message to the NG-RAN. The message includes information of the PDU session to be established. The information of the PDU session includes a session identifier, session QoS information, QoS flow information, uplink tunnel information for each session, and/or a source-to-target transparent container. The message includes the type of handover.

The message includes the information of direct data forwarding, indirect data forwarding, or data forwarding being not possible. The above information may be included in a N2 SM information container. Direct data forwarding information may be information of direct data forwarding path availability. Data forwarding being not possible means that indirect data forwarding is not feasible or both direct and indirect data forwarding are not feasible.

The message may also include a mapping relationship between a QoS flow and an EPS bearer in the PDU session, that is, the E-RAB identifier mapped by the QoS flow and/or the mapped QoS information.

Operation 406: the NG-RAN sends a handover request acknowledgement message to the AMF. The message includes one or more of the following information:

1) the target-to-source transparent container. The target-to-source transparent container may further include a mapping relationship between a QoS flow and an EPS bearer in the PDU session, that is, the EPS bearer identifier mapped by the QoS flow and/or the mapped QoS information.
2) the established PDU session information list accepted by the NG-RAN. The PDU session information list includes a PDU session identifier, downlink tunnel information of the NG3 interface used for the PDU session, QoS flow information accepted by the PDU session, and unaccepted QoS flow information.

If it is direct data forwarding, for a QoS flow accepted for data forwarding or a E-RAB accepted for data forwarding by the NG-RAN, the NG-RAN allocates the downlink data forwarding tunnel information to the respective E-RAB, and the E-RAB identifier and the downlink tunnel information for the E-RAB allocated by the NG-RAN are included in the handover request acknowledgement message. If it is indirect data forwarding, for a QoS flow accepted for data forwarding by the NG-RAN, the NG-RAN allocates the downlink data forwarding tunnel information for the PDU session to which the QoS flow belongs; the PDU session identifier and the downlink tunnel information corresponding to PDU session allocated by the NG-RAN are included in the handover request acknowledgement message, and the QoS flow list accepted for data forwarding may be further included in the handover request acknowledgement message. If data forwarding is not possible, the NG-RAN does not need to allocate data forwarding tunnel information.

3) the PDU session information list failed to be setup by the NG-RAN. The PDU session information list includes the PDU session identifier and the reason for not accepting.

Operation 407: the AMF sends an update SM context request message to the SMF. If tunnel information for data forwarding is received from the NG-RAN, the AMF sends the data forwarding tunnel information received from the NG-RAN to the SMF. The AMF sends the tunnel information received from the NG-RAN for data forwarding to the SMF. The AMF sends the information of whether it is direct data forwarding or indirect data forwarding to the SMF. AMF may inform SMF of direct data forwarding or indirect data forwarding in an explicit manner. The AMF may also inform the SMF in an implicit manner, that is, if the SMF receives the data forwarding tunnel information for each E-RAB, it is direct data forwarding, and if the SMF receives the data forwarding tunnel information for each PDU session, it is indirect data forwarding, and if no data forwarding tunnel information is received, data forwarding is not feasible or data forwarding is not accepted by the target base station. The message includes a PDU session to which the EPS bearer belongs. The message may also include a mapping relationship between an EPS bearer and a QoS flow in the PDU session.

Operation 408: the SMF initiates a session modification process between it and the UPF. If the SMF receives the data forwarding tunnel information of each PDU session, the SMF sends the NG3 interface downlink data forwarding tunnel information allocated by the NG-RAN to the UPF through the N4 session modification process, wherein the data forwarding tunnel information corresponds to each PDU session. The SMF allocates the data forwarding tunnel information between the SGW and the UPF, or the UPF allocates the tunnel information for data forwarding between the SGW and the UPF and sends the tunnel information to the SMF, wherein the data forwarding tunnel information is for each E-RAB. The N4 session modification message includes a PDU session to which the EPS bearer belongs. The N4 session establishment or N4 session modification message may further include a mapping relationship between an EPS bearer and a QoS flow in the PDU session. If the SMF receives the data forwarding tunnel information for an E-RAB, it is direct data forwarding, and the SMF or the UPF does not need to allocate data forwarding tunnel information.

Operation 409: the SMF sends an update SM context response message to the AMF. The SMF sends the tunnel information for data forwarding to the AMF. Corresponding to direct data forwarding, the SMF sends the tunnel information for each E-RAB received from the AMF to the AMF, and the tunnel information for each E-RAB is allocated by the target NG-RAN. Corresponding to indirect data forwarding, the SMF sends the tunnel information for each E-RAB allocated by the SMF or UPF to the AMF, and the tunnel information is used for data forwarding between the SGW and the UPF.

Operation 410: the AMF sends a forward relocation response message to the MME. The message includes data forwarding tunnel information. For direct data forwarding, the tunnel information is allocated by the target NG-RAN. For indirect data forwarding, the tunnel information is tunnel information received from the SMF for data forwarding between the SGW and the UPF. The message includes a target-to-source transparent container.

Operation 411: the MME sends a creating indirect data forwarding tunnel request message to the SGW for indirect data forwarding, if the MME receives the tunnel information for data forwarding. The message is used to send tunnel information for data forwarding between the SGW and the UPF to the SGW. The SGW sends a creating indirect data forwarding tunnel response message to the MME. The message includes uplink tunnel information allocated by the SGW for data forwarding over the S1 interface. For direct data forwarding, this operation is not required to be performed. The MME knows whether it is direct data forwarding or indirect data forwarding according to the information of direct forwarding path availability received from the source base station, as described in operation 402.

Operation 412: the MME sends a handover command message to the E-UTRAN. The message includes a target-to-source transparent container. The message includes the type of handover.

The message includes data forwarding tunnel information. For indirect data forwarding, the tunnel information is allocated by the SGW. For direct data forwarding, the tunnel information is allocated by the target NG-RAN.

Operation 413: the E-UTRAN sends a handover command message to the UE.

The message may also include a mapping relationship between a QoS flow and an EPS bearer in the PDU session, that is, the EPS bearer identifier and/or the mapped QoS information mapped by the QoS flow.

The E-UTRAN forwards data. For the E-RAB for which the data forwarding tunnel information is received, it indicates that the target base station accepts data forwarding, and the E-UTRAN forwards the data to the corresponding tunnel. For direct data forwarding, the target NG-RAN directly receives the data forwarded by the E-UTRAN. For indirect data forwarding, the SGW receives the data forwarded by the E-UTRAN. The SGW forwards the data to the UPF. The SGW forwards data to the UPF for each EPS bearer accepted for data forwarding on the corresponding tunnel. The UPF forwards the data to the NG-RAN. The UPF sends the data, belonging to the same PDU session, received from the SGW on the tunnel for each EPS bearer to the NG-RAN through the corresponding PDU session tunnel, that is, the UPF performs mapping of multiple tunnels to one tunnel. The UPF forwards data to the NG-RAN according to the session transmission manner in the 5GS, for example, through which several QoS flows to send downlink data in each PDU session, and how to set the header of the QoS flow. The UPF adds a QoS flow identifier (QFI) to the packet header forwarded to the target NG-RAN.

The NG-RAN receives the forwarded data from a PDU session tunnel, and the NG-RAN sends the received data to the UE according to an existing manner. The NG-RAN receives the forwarded data from an E-RAB tunnel, and the NG-RAN directly sends the data to the PDCP layer of the corresponding DRB with no need for SDAP layer processing. Based on the mapping between an E-RAB ID(s) and a QoS Flow ID(s) received in the handover request message, the NG-RAN knows the DRB corresponding to the E-RAB, and directly sends the received forwarded data to the PDCP entity of the corresponding DRB. The NG-RAN first sends the forwarded data to the UE, and then sends the data received from a new NG-U to the UE.

During the establishment of the PDU session or the establishment of the EPS bearer, the UE receives the QoS information of the QoS flow mapped by the EPS bearer and/or the QoS flow information from the network. The UE establishes the correspondence between the ongoing EPS bearer and the QoS flow included in the handover command message. For an EPS bearer that does not have a corresponding QoS flow, the UE may delete it.

Alternatively, the UE obtains the mapping relationship between a QoS flow and an EPS bearer in the PDU session from the handover command message. The UE establishes the correspondence between the ongoing EPS bearer and the QoS flow included in the handover command message. For an EPS bearer that does not have a corresponding QoS flow, the UE may delete it.

Operation 414: the UE sends a handover complete message to the NG-RAN.

Operation 415: the NG-RAN sends a handover notify message to the AMF. The message includes the tunnel information allocated by the NG-RAN for downlink data transmission.

Operation 416: the AMF sends an update SM context request message to the SMF.

Operation 417: the SMF sends a N4 session modification message to the UPF. The UPF sends the N4 session modification response message to the SMF.

The AMF sends the tunnel information allocated by the NG-RAN for downlink data transmission to the UPF through the AMF.

Operation 418: the SMF sends an update SMF context response message to the AMF.

As such, the description of the first embodiment of first handover method of the application is completed, and the problem of coexistence of different data forwarding methods when the UE moves between the EPS and the 5G system is completely solved by the method, thereby avoiding data loss, ensuring service continuity and interoperability of different equipment from different vendors, and reducing configuration by operator.

Figure 5:
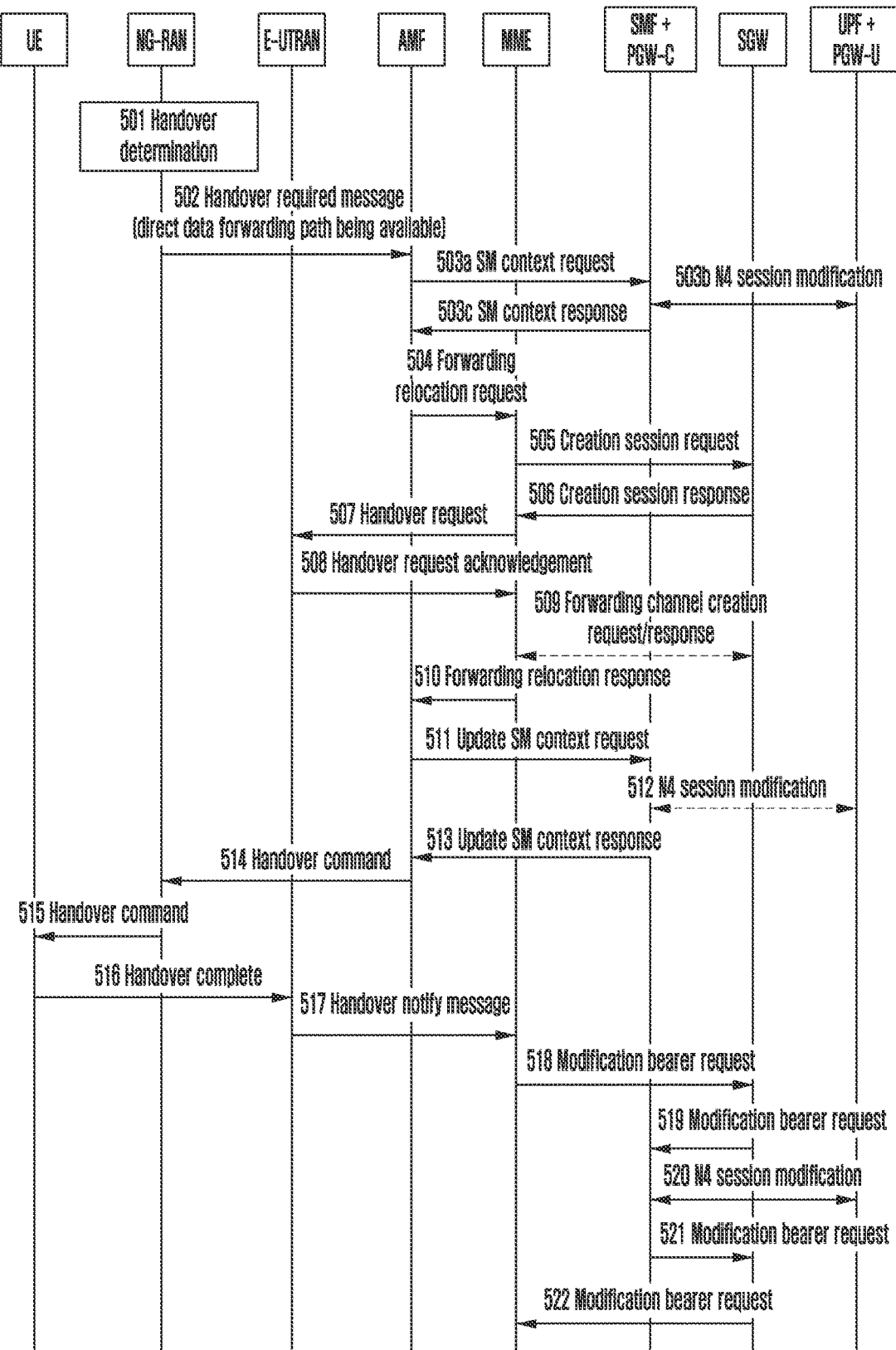
FIG. 5 shows a schematic diagram of a second embodiment of a first method for supporting handover according to an embodiment of the disclosure.

The second embodiment of the first method for supporting handover according to the application is shown in FIG. 5.

FIG. 5 shows a schematic diagram of the second embodiment of the first method for supporting handover according to an embodiment of the disclosure.

Referring to FIG. 5, the method solves the above two problems, so that data forwarding in the handover process is successfully performed, and different entities in the network work in coordination to ensure successful data forwarding. Detailed descriptions of operations unrelated to the embodiment are omitted herein. This embodiment is used for handover from 5GS to EPS, including operations of:

Operation 501: the NG-RAN determines to hand over the UE to the E-UTRAN.

The E-UTRAN herein may be an eNB connected to the EPC. The NG-RAN may be a gNB or a centralized unit CU in a gNB or an eNB connected to the 5GC.

The user plane path before handover is UPF to NG-RAN. The SGW needs to support an interface to connect with the UPF. The UPF may include the function of the PGW user plane to perform the function of the user plane anchor node during the handover between different RATs.

The UE has one or more PDU sessions in progress. Each PDU session includes one or more QoS flows. In a PDU session establishment process or a guaranteed business rate (GBR) QoS flow establishment process, the mapped EPS QoS information and/or the EPS bearer identifier are allocated for the QoS flow. The non-guaranteed business rate (non-GBR) QoS flow is mapped to a default EPS bearer. The GBR QoS flow is mapped to an EPS dedicated bearer. The EPS QoS information mapped to the QoS flow may be allocated by the PCC or SMF. The EPS bearer identifier mapped to the QoS flow may be allocated by the SMF or AMF. For supporting the handover between different systems, the SMF may have the function of the PGW control plane. In the scene of deploying the PCC, the policy control function (PCF) provides the EPS QoS mapped to QoS flow to the SMF. In order to support handover between different systems, the PCF may also have a policy control and charging rules function (PCRF). The SMF sends the EPS QoS information and/or EPS bearer identifier mapped to the QoS flow to the UE through the AMF, for example, sending them through a non-access layer message PDU session establishment message to the UE. During the PDU session establishment or guaranteed business rate (GBR) QoS flow establishment process, the SMF may also send the EPS QoS information and/or E-RAB identifier mapped to the QoS flow to the NG-RAN through the AMF. The AMF sends the EPS QoS information and/or E-RAB identifier mapped to the QoS flow to the NG-RAN through an initial context establishment request message or a PDU session resource establishment request message. The NG-RAN may send the EPS QoS information or E-RAB identifier mapped to the QoS flow to the UE through an RRC message. The E-RAB and EPS bearer are the same or one-to-one correspondence, which are referred to as an EPS bearer in the core network, and are referred to as an E-RAB in the access network. The E-RAB identifier and the EPS bearer identifier are the same or one-to-one correspondence, which are referred to as an EPS bearer identifier in the core network, and are referred to as an E-RAB identifier in the access network.

Operation 502: the NG-RAN sends the handover required message to the AMF. The message includes the identifier of the target eNB, a source-to-target transparent container. The source-to-target transparent container includes an E-RAB identifier and downlink data forwarding proposed for the E-RAB. The NG-RAN obtains the EPS bearer identifier mapped to the QoS flow in the PDU session through the PDU session establishment process or through the handover process, as well may obtain the mapped EPS QoS information. The NG-RAN determines whether to propose data forwarding according to the mapping of QoS flow to E-RAB and the QoS information, and the NG-RAN may consider other factors such as whether there is buffered data to determine whether to propose data forwarding, without affecting the main concept of the application. The message includes information of direct forwarding path availability.

The message further includes identifier information indicating the MME to which the target eNB is connected. The identifier information may be a tracking area identifier or an MME identifier.

The message also includes the handover type.

The AMF determines whether direct data forwarding or indirect data forwarding is available. If the AMF does not receive information of direct forwarding path availability from the source NG-RAN, the AMF determines whether indirect data forwarding is feasible. If direct data forwarding is feasible, direct data forwarding is used.

Operation 503a: the AMF sends a session management (SM) context request message to the SMF. Based on the information received in the handover required message, the AMF knows that the handover is a handover between different systems, and the AMF requests the SMF to provide the SM context. The AMF may also request an EPS bearer context. The AMF sends the message to each SMF serving the UE. The AMF sends a direct forwarding indication or information of direct forwarding path availability to the SMF. The direct forwarding indication may indicate direct data forwarding or indirect data forwarding. The AMF informs the SMF the information of whether direct data forwarding or indirect data forwarding is available. The SMF saves the received information.

Operation 503b: the SMF sends an N4 session modification request message to the UPF. The message includes the direct forwarding indication or the information of direct forwarding path availability. The direct forwarding indication may indicate direct data forwarding or indirect data forwarding. The UPF saves the direct forwarding indication or the information of whether direct data forwarding is feasible. The UPF sends an N4 session modification response message to the SMF.

Operation 503c: the SMF sends an SM context response message to the AMF. The message includes the SM context of the UE. The SM context also includes the mapped EPS bearer context, such as EPS bearer identifier and/or the EPS QoS information. If the SMF has the mapped EPS bearer context, the SMF always feeds back the mapped EPS bearer context along with the SM context to the AMF at the same time, when the AMF requests the SM context. Alternatively, the SMF sends the mapped EPS bearer context to the AMF along with the SM context, only when the AMF requests the SM context and also requests the mapped EPS bearer context to the SMF.

SMF determines direct data forwarding, indirect data forwarding, or data forwarding not possible. If the direct forwarding path availability is received by the SMF, the SMF determines to use direct data forwarding. If the SMF does not receive direct data forwarding path availability, the SMF determines whether indirect data forwarding is feasible. If indirect data forwarding is feasible, the SMF determines to use indirect data forwarding. If the SMF does not receive direct data forwarding path availability and there is no indirect data forwarding connectivity between source and target, the SMF determines that data forwarding is not possible.

The SMF sends information of direct data forwarding, indirect data forwarding, or data forwarding being not possible, to the AMF. Direct data forwarding information may be information of direct data forwarding path availability. Data forwarding being not possible means that indirect data forwarding is not possible or both direct and indirect data forwarding are not possible.

Operation 504: the AMF sends a forward relocation request message to the MME. The AMF selects and finds the MME according to the identifier information of the MME connected to the target eNB included in the handover required message. The identifier information of the MME connected to the target eNB may be a TAI. The message includes an identifier of the target eNB, a source-to-target transparent container, and the mapped EPS UE context information. The mapped EPS UE context information includes UE mobile management (MM) context information and session SM context information.

The AMF sends a direct forwarding indication to the MME.

If the AMF does not receive information of direct data forwarding path availability from the source NG-RAN, the AMF determines whether indirect data forwarding is feasible. If direct data forwarding is feasible, direct data forwarding is used. If direct data forwarding is not feasible, the AMF determines whether indirect data forwarding is feasible. The AMF knows whether indirect data forwarding is feasible based on the information received from the SMF. The AMF knows whether indirect data forwarding is feasible based on information of direct data forwarding, indirect data forwarding, or data forwarding being not possible, received from the SMF. The AMF informs the MME whether it is direct data forwarding or indirect data forwarding. The AMF may also inform the MME of information of data forwarding being not possible. Data forwarding being not possible means that both direct data forwarding and indirect data forwarding are not possible or indirect data forwarding is not possible.

Operation 505: the MME sends a creation session request message to the SGW. The message includes EPS bearer context information.

Operation 506: the SGW sends a creation session response message to the MME. The message includes tunnel information for an S1 interface to send uplink data allocated by the SGW.

Operation 507: the MME sends a handover request message to the E-UTRAN. The message includes a source-to-target transparent container and E-EAB context. The E-RAB context includes the E-RAB to be established and uplink tunnel information of the S1 interface allocated by the SGW. The E-RAB context includes information of whether data forwarding is possible. The message includes the handover type, and the specific content thereof is the same as that in Operation 902, which details are not described herein again. The message includes information that data forwarding is not possible. If the MME receives indirect data forwarding information from the AMF (e.g., direct data forwarding indication indicates indirect data forwarding) but indirect data forwarding is not feasible, the MME determines that data forwarding is not possible. If the MME receives a direct data forwarding indication from the AMF indicating direct data forwarding or the MME receives from the AMF that direct data forwarding path availability, data forwarding is possible.

Operation 508: the E-UTRAN sends a handover request acknowledgement message to the MME. The message includes the established E-RAB list and the E-RAB list failed to be established, as well as the target-to-source transparent container. Corresponding to the established E-RAB, the tunnel information for downlink data transmission of the S1 interface is further included. Corresponding to the established E-RAB, if the source base station proposes the downlink data forwarding, data forwarding is possible and the target eNB accepts the downlink data forwarding, the target base station includes the tunnel information for data forwarding allocated by the E-UTRAN for each E-RAB accepted for downlink data forwarding.

Operation 509: the MME requests the SGW to create an indirect data forwarding tunnel. This operation is performed only when indirect data forwarding is applied. If the MME receives indirect data forwarding information from the AMF and indirect data forwarding is feasible, the MME knows that it is indirect data forwarding. If the MME receives the downlink tunnel information for data forwarding from the E-UTRAN, the MME requests the SGW to create an indirect data forwarding tunnel. The MME sends the transport layer address and TEID allocated by the eNB for data forwarding to the SGW. The transport layer address and TEID correspond to each E-RAB.

The SGW sends an indirect data forwarding tunnel creation response message to the MME. The message includes the information allocated by the SGW for data forwarding between the SGW and the UPF. The information used for data forwarding between the SGW and the UPF includes an E-RAB identifier and tunnel information used by the E-RAB for data forwarding. The tunnel information includes a transport layer address and a TEID allocated by the SGW. The SGW allocates downlink data forwarding tunnel information for the E-RAB accepted for downlink data forwarding. The SGW allocates uplink data forwarding tunnel information for the E-RAB accepted for uplink data forwarding. The data forwarding tunnel information included in the E-RAB information may include uplink and/or downlink data forwarding tunnel information.

Operation 509 is performed when indirect data forwarding is feasible.

Operation 510: the MME sends a forward relocation response message to the AMF. The message includes tunnel information for data forwarding. For direct data forwarding, the data forwarding tunnel information is received from the target base station by the MME. For indirect data forwarding, the tunnel information is allocated by the SGW and is received by the MME from the SGW. The tunnel information corresponds to each EPS bearer. The tunnel information of data forwarding may include downlink and/or uplink data forwarding tunnel information. The message includes a target-to-source transparent container.

The MME directly sends the E-RAB information to the AMF, and the AMF performs the conversion.

Operation 511: the AMF sends an update SM context request message to the SMF. The AMF requests the SMF to create a data forwarding tunnel. For indirect data forwarding, the AMF requests the SMF to create a data forwarding tunnel. The message includes PDU session information. The PDU session information includes a PDU session identifier, a QoS flow information included in the PDU session, the EPS bearers needing data forwarding in the EPS system in each PDU session, a mapping relationship between a QoS flow and an EPS bearer, an EPS bearer identifier and/or QoS information of the EPS bearer. The message includes tunnel information received from the MME for data forwarding. The AMF sends a direct forwarding indication to the SMF. The direct forwarding indication may indicate direct data forwarding or indirect data forwarding. The AMF informs the SMF whether it is direct data forwarding or indirect data forwarding. This operation is mandatory for indirect data forwarding. For direct data forwarding, operation 511 and operation 513 may not be performed.

Operation 512 is performed for indirect data forwarding. For direct data forwarding, operation 512 may not be performed. The SMF determines whether to perform operation 512 according to the information received in operation 503 or according to direct data forwarding or indirect data forwarding received from the AMF in this operation. Corresponding to the method in which the SMF perform determination according to the information received in operation 503, if the SMF receives direct data forwarding path availability, the SMF determines to use direct data forwarding. If the SMF does not receive direct data forwarding path availability, the SMF determines whether indirect data forwarding is available. Thus, the SMF knows whether it is direct data forwarding or indirect data forwarding.

Operation 512: the SMF sends an N4 session modification message to the UPF. The message includes PDU session information. The PDU session information includes a PDU session identifier, a QoS flow information included in the PDU session, the EPS bearers needing data forwarding in the EPS system in each PDU session, a mapping relationship between a QoS flow and an EPS bearer, and an EPS bearer identifier and/or QoS information of the EPS bearer. The message includes tunnel information received from the AMF for data forwarding.

The N4 session modification message includes EPS bearer information included in the PDU session. The EPS bearer information includes an EPS bearer identifier and tunnel information used by the EPS bearer for data forwarding. The SMF informs the UPF the correspondence between a QoS flow and an EPS bearer in the PDU session. The UPF knows the QoS flow information of the PDU session in the 5G system. The UPF receives the EPS bearer information and the mapping relationship between a QoS flow and an EPS bearer in the PDU session, from the SMF.

The SMF sends the information of the direct forwarding indication to the UPF. The direct forwarding indication may indicate direct data forwarding or indirect data forwarding. The SMF informs the UPF whether it is direct data forwarding or indirect data forwarding.

For indirect data forwarding, the SMF allocates tunnel information for data forwarding between the NG-RAN and the UPF, or the UPF allocates tunnel information for data forwarding between the NG-RAN and the UPF and sends it to the SMF. For indirect data forwarding, the PDU session tunnel is used for data forwarding between the NG-RAN and the UPF. The UPF allocates data forwarding tunnel information for the PDU session corresponding to the EPS bearer accepted for data forwarding. The tunnel information includes a transport layer address and a TEID. The UPF sends the allocated tunnel information for data forwarding to the SMF. The SMF receives the N4 session modification response message from the UPF. The message includes tunnel information allocated by the UPF for data forwarding between the NG-RAN and the UPF. For direct data forwarding, the UPF does not need to allocate data forwarding tunnel information. According to the information received in operation 503 or in this operation, the UPF knows whether it is direct data forwarding or indirect data forwarding. For direct data forwarding, operation 512 may also not be performed.

Operation 513: the SMF sends an update SM context response message to the AMF. For direct data forwarding, the message includes tunnel information for data forwarding, received by the SMF from the AMF. The tunnel information is used for direct data forwarding, and is for each EPS bearer. For indirect data forwarding, the message includes tunnel information allocated by the SMF or UPF for data forwarding between the NG-RAN and the UPF. The tunnel information is for each PDU session.

Operation 514: the AMF sends a handover command message to the NG-RAN. The message includes a target-to-source transparent container, tunnel information for data forwarding allocated by E-UTRAN or the UPF or SMF. The tunnel information for data forwarding is for each PDU session or each E-RAB. For direct data forwarding, the tunnel information for data forwarding is for each E-RAB for which data forwarding is accepted by the target eNB. For indirect data forwarding, the tunnel information for data forwarding is for each PDU session to which the QoS flow accepted for data forwarding belongs. The message further includes established PDU session information and PDU session information that is not successfully established. The established PDU session information includes the established QoS flow information and the QoS flow information that is note successfully established.

Operation 515: the NG-RAN sends a handover command message to the UE.

The NG-RAN forwards the data.

If the NG-RAN receives the data forwarding tunnel information for each PDU session, the NG-RAN forwards the data to the UPF. The NG-RAN forwards data of QoS flows accepted for data forwarding to the UPF on the tunnel the corresponding PDU session. The NG-RAN sends the data of each QoS flow to the UPF on the user plane tunnel allocated for the PDU session. For the downlink data, the NG-RAN sends downlink packets to the UPF on the tunnel allocated for downlink data forwarding. The UPF forwards the data to the SGW. The UPF adds the QFI corresponding to the QoS flow to the packet header, and forwards the data received from the NG-RAN to the SGW through the user plane tunnel allocated for the mapped EPS bearer. The UPF forwards the data of different QoS flows in the PDU session to the SGW through the user plane tunnel allocated for the mapped EPS bearer according to the mapping relationship between a QoS flow and an EPS bearer. According to the mapping relationship between a QoS flow and an EPS bearer and the EPS bearer information accepted for data forwarding, the UPF knows the QoS flow accepted for data forwarding, and the UPF forwards the data of the QoS flow accepted for data forwarding to the SGW through the user plane tunnel allocated for the mapped EPS bearer. Corresponding to the QoS flow that not accepted for data forwarding, there is no corresponding data forwarding tunnel, and the UPF discards the data.

If the NG-RAN receives the tunnel information for each E-RAB, the NG-RAN forwards the data of the QoS flows accepted for data forwarding to the respective E-RAB tunnel. The NG-RAN forwards the PDCP Service Data Unit (SDU) to the respective E-RAB tunnel. The PDCP SDU does not have a sequence number (SN). For direct data forwarding, the data is sent directly to the target base station.

For indirect data forwarding, the SGW forwards the data to the E-UTRAN. The SGW sends the data received from the tunnel for each EPS bearer from the UPF to the E-UTRAN through the corresponding tunnel allocated by the E-UTRAN. The SGW forwards the data to the E-UTRAN according to the session transmission mode in the EPS.

The E-UTRAN receives the forwarded data from the E-RAB tunnel, and the E-UTRAN first sends the forwarded data to the UE, and then sends the data received from the new S1-U to the UE.

During the establishment of the PDU session or the establishment of the GBR QoS flow, the UE receives the EPS QoS information and/or the EPS bearer identifier information mapped to the QoS flow from the network. The UE associates the ongoing QoS flow and the EPS bearer identifier included in the handover command message to establish a correspondence therebetween. For the QoS flow without corresponding to EPS bearer, the UE may delete it.

Operation 516: the UE sends a handover complete message to the E-UTRAN.

Operation 517: the E-UTRAN sends a handover notify message to the MME. The message includes tunnel information allocated by the E-UTRAN for downlink data transmission.

Operation 518: the MME sends a modification bearer request message to the SGW. The message includes tunnel information used by the S1 interface for downlink data transmission.

Operation 519: the SGW sends a modification bearer request message to the SMF. The SMF may further have the function of the PGW control plane. The SGW allocates tunnel information for downlink data transmission between the SGW and the UPF, wherein the tunnel information corresponds to each EPS bearer or each PDU session.

Operation 520: the SMF request a UPF session modification. The SMF may further have the function of the PGW control plane. The SMF sends the tunnel information for the downlink data transmission between the SGW and the UPF allocated by the SGW to the UPF, wherein the tunnel information corresponds to each EPS bearer or each PDU session. The UPF sends a session modification response to the SMF. The UPF allocates tunnel information for uplink data transmission between the SGW and the UPF, and the UPF sends the tunnel information for the uplink data transmission to the SMF.

Operation 521: the SMF sends a modification bearer response message to the SGW. The message includes tunnel information for uplink data transmission between the SGW and the UPF, which the information is allocated by the UPF.

Operation 522: the SGW sends a modification bearer response message to the MME.

As such, the description of the second embodiment of the first handover method of the application is completed, and the problem of coexistence of different data forwarding methods when the UE moves between the EPS and the 5GS system is completely solved by the method, thereby avoiding data loss, ensuring service continuity and interoperability of different equipment from different vendors, and reducing configuration by operator.

Figure 6:
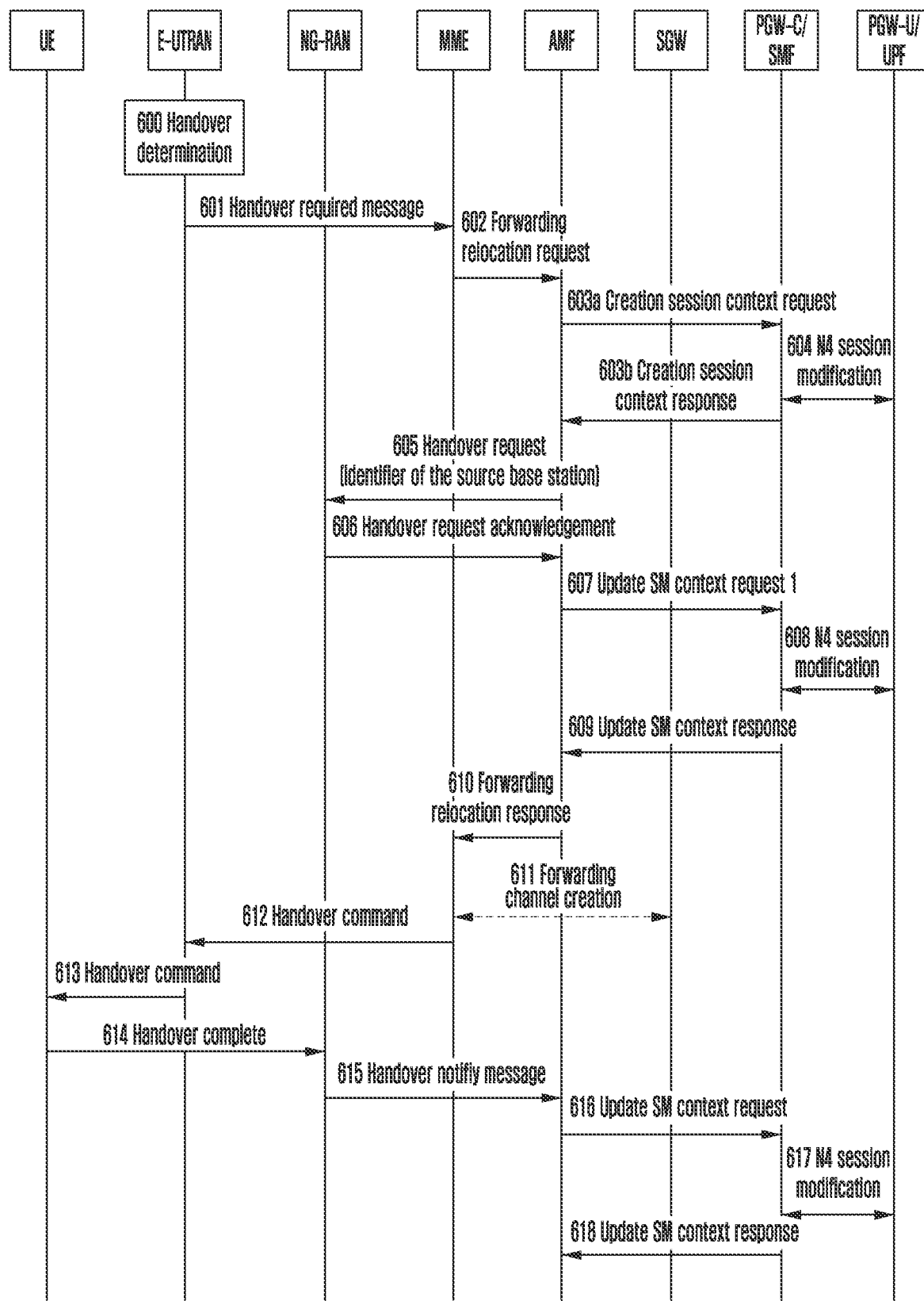
FIG. 6 shows a schematic diagram of a second method for supporting handover according to an embodiment of the disclosure.

The second method for supporting handover according to the application is shown in FIG. 6.

FIG. 6 shows a schematic diagram of a second method for supporting handover according to an embodiment of the disclosure.

Referring to FIG. 6, in the method, the source base station informs the target base station of the identifier of the source base station or the identifier of the source cell through the core network, and the target base station determines whether direct data forwarding is available, so that the target base station determines how to allocate the data forwarding tunnel information. The method solves the above two problems, so that data forwarding in the handover process is successfully performed, and different entities in the network work in coordination to ensure successful data forwarding. Detailed descriptions of operations unrelated to the embodiment are omitted herein. The method includes the operations of:

Operation 600: the E-UTRAN determines to hand over the UE to the NG-RAN.

The E-UTRAN herein may be an eNB connected to the EPC. The NG-RAN may be a gNB or a centralized unit CU in a gNB or an eNB connected to the 5GC. An eNB connected to the 5GC may also be referred to as an ng-eNB.

The user plane path before the handover is PGW-U+UPF (the UPF having the function of the PGW user plane, hereinafter referred to as UPF) and the SGW to the E-UTRAN. The SGW needs to support the interface to connect with PGW-U+UPF. The UE has one or more PDU sessions in progress. Each PDU session includes one or more EPS bearers. In a PDU session establishment process or an EPS bearer establishment process, the mapped QoS information and/or the QoS flow identifier of the QoS flow are allocated for the EPS bearer. The default EPS bearer is mapped to a non-guaranteed business rate (non-GBR) QoS flow. The QoS information and/or the QoS flow identifier of the QoS flow mapped to the EPS bearer may be allocated by the function of the PCC or the PGW control plane. In order to support handover between different systems, the function of the PGW control plane may further have an SMF function. In the scene of deploying the PCC, the policy control and charging rules function (PCRF) provides the QoS information and/or QoS flow identifier of the QoS flow mapped to the EPS bearer to the SMF. In order to support handover between different systems, the PCRF may also have a policy control function (PCF). The SMF sends the QoS information and/or QoS identifier of the QoS flow mapped to the EPS bearer to the UE through the MME, for example, sending them to the UE through a non-access layer message PDN connection establishment message. During the PDU session establishment process or the EPS bearer establishment process, the SMF may also send the QoS information and/or QoS flow identifier of the QoS flow mapped to the EPS bearer to the E-UTRAN through the MME. The E-UTRAN may send the mapping information to the UE through an RRC message. The E-RAB and EPS bearer identifiers are the same or one-to-one correspondence, which are referred to as an EPS bearer in the core network, and are referred to as an E-RAB in the access network. The E-RAB identifier and the EPS bearer identifier are the same or one-to-one correspondence, which are referred to as an EPS bearer identifier in the core network, and are referred to as an E-RAB identifier in the access network.

Operation 601: the E-UTRAN sends a handover required message to the MME. The message includes the identifier of the target NG-RAN node, and a source-to-target transparent container. The message also includes identifier information indicating the AMF to which the target NG-RAN node is connected. The identifier information may be a tracking area identifier, a network sharding identifier, an AMF pool identifier, an AMF identifier or the like.

The message includes information of direct forwarding path availability.

The message includes an identifier of the source base station or an identifier of the source cell. The information may be included in the source-to-target transparent container or directly included in the handover required message.

The source-to-target transparent container includes a PDU session identifier, an identifier of the QoS flow in the PDU session, and the downlink data forwarding proposed for the QoS flow. The eNB obtains the PDU session identifier corresponding to the EPS bearer and/or the QoS flow identifier in the PDU session through the PDN connection establishment process or through the handover process. It is also possible to obtain the QoS information of the mapped QoS flow. The eNB determines whether to propose data forwarding according to the E-RAB to PDU session or according to the mapping of the QoS flow in the E-RAB to the PDU session and the QoS information, and the eNB may consider other factors such as whether there is buffered data to determine whether to propose data forwarding, without affecting the main content of the application.

Operation 602: the MME sends a forward relocation request message to the AMF. The MME selects and finds the AMF according to the identifier information of the AMF to which the target NG-RAN node is connected, which the information is included in the handover required message. The message includes the identifier of the target NG-RAN node, the source-to-target transparent container and the UE context information. The UE context information includes UE mobile management (MM) context information and a session management context. The message includes the handover type. The message includes an identifier of the source base station or an identifier of the source cell. The information may be included in the source-to-target transparent container or directly included in the forward relocation request message.

The MME sends a direct forwarding indication to the AMF. If the MME doesn't receives direct data forwarding path availability from the source E-UTRAN, the MME determines whether indirect data forwarding is possible. The MME informs the AMF of the information of whether direct data forwarding or indirect data forwarding. The MME may also inform AMF of the information of data forwarding being not possible. Data forwarding being not possible means that both direct data forwarding and indirect data forwarding are not possible. Alternatively, the MME may also inform the AMF of the information of direct data forwarding path is available.

The MME determines whether indirect data forwarding is possible. The MME informs the information of whether indirect data forwarding is possible to the AMF. Data forwarding being not possible means that indirect data forwarding is not possible.

Operation 603a: the AMF sends a creation session (SM) context request message to the SMF. The AMF converts the received EPS UE context into a 5GS UE context. The AMF may also exchange with the PCRF to obtain the converted 5GS UE context. The AMF selects the SMF that serves the UE.

According to the information received in the forward relocation request message, the AMF knows that the handover is a handover between different systems, and the AMF requests the SMF to provide the SM context. The AMF sends the message to each SMF serving the UE.

The AMF sends the direct forwarding indication or direct data forwarding being available to the SMF, and the AMF informs the SMF of the information that direct data forwarding or indirect data forwarding is available.

Operation 604: the SMF initial an N4 session modification process between it and the UPF. The SMF sends a direct forwarding indication to the UPF, and the SMF informs the UPF of the information that direct data forwarding or indirect data forwarding is available. The SMF may also inform the UPF of the information that direct data forwarding is available.

Operation 603b: the SMF sends a creation session context response message to the AMF. The message includes the SM context of the UE. The SM context also includes a mapping relationship between an EPS bearer and a QoS flow in the PDU session. If the SMF has the mapped EPS bearer context, the SMF always feeds back the mapped EPS bearer context together with the SM context to the AMF at the same time when the AMF requests the SM context. Alternatively, the SMF sends the mapped EPS bearer context to the AMF when the AMF requests the mapped EPS context at the same time.

The 5GS UE context includes QoS information in the 5G system. The QoS information in the 5G system includes a QoS rule and/or a QoS profile. The AMF may map EPS QoS information into 5G QoS information, or the AMF interact with the 5G policy control function (5G-PCF) to derive 5G QoS information.

The SMF determines direct data forwarding, indirect data forwarding, or data forwarding not possible. If the direct forwarding indication received by the SMF indicates that direct data forwarding is available, the SMF determines to use direct data forwarding. If the direct forwarding indication received by the SMF indicates indirect data forwarding and that indirect data forwarding is possible, the SMF determines to use indirect data forwarding. If the direct forwarding indication received by the SMF indicates indirect data forwarding but no indirect data forwarding connectivity between source and target, the SMF determines that data forwarding is not possible. The SMF includes information of direct data forwarding, indirect data forwarding, or data forwarding being not possible in the N2 session management (SM) information container. Or, the SMF determines that indirect data forwarding or data forwarding is not feasible. The SMF informs the target NG-RAN of the information. Or, the SMF determines whether indirect data forwarding is not possible. The SMF informs the target NG-RAN of the information that indirect data forwarding is not possible and whether direct data forwarding is available.

Operation 605: the AMF sends the handover request message to the NG-RAN. The message includes information of the PDU session to be established. The information of the PDU session includes a session identifier, session QoS information, QoS flow information, uplink tunnel information for each session, and/or a source-to-target transparent container. The message includes the type of handover. The message includes an identifier of the source base station or an identifier of the source cell. The identifier of the source base station may be sent to the target base station by using a source-to-target transparent container, or may be sent to the target base station by using the handover required of operation 601, the forwarding relocation request of operation 602, and the handover request message of this operation.

The message includes information that data forwarding is not possible. That data forwarding is not possible means that indirect data forwarding is not possible, or both direct data forwarding and indirect data forwarding are not possible. The message may also include information that direct data forwarding is available. The above information may be included in a N2 SM information container.

The message may also include a mapping relationship between a QoS flow and an EPS bearer in the PDU session, that is, the E-RAB identifier mapped by the QoS flow and/or the mapped QoS information.

Operation 606: the NG-RAN sends a handover request acknowledgement message to the AMF. The message includes one or more of the following information:
1) the target-to-source transparent container. The target-to-source transparent container may further include a mapping relationship between a QoS flow and an EPS bearer in the PDU session, that is, the EPS bearer identifier mapped by the QoS flow and/or the mapped QoS information.
2) the established PDU session information list accepted by the NG-RAN. The PDU session information list includes a PDU session identifier, downlink tunnel information of the NG3 interface used for the PDU session, QoS flow information accepted by the PDU session, and unaccepted QoS flow information.

If the NG-RAN does not receive that data forwarding is not possible, the target NG-RAN determines whether direct data forwarding is feasible according to the received identifier of the source base station or the identifier of the source cell, thereby determining whether to use direct data forwarding or indirect data forwarding. Direct data forwarding is used if direct data forwarding is feasible, and indirect data forwarding is used if direct data forwarding is not feasible. If the NG-RAN receives that data forwarding is not possible, the NG-RAN does not allocate a data forwarding tunnel identifier.

Another method for the NG-RAN to determine whether to use direct data forwarding or indirect data forwarding is that: data forwarding being not possible received from the AMF means that indirect data forwarding is not possible, and the target NG-RAN judges whether direct data forwarding is feasible according to the received identifier of the source base station or the identifier of the source cell; direct data forwarding is used if direct data forwarding is feasible, and indirect data forwarding is used if direct data forwarding is not feasible and indirect data forwarding being not possible is not received. If direct data forwarding is not feasible and indirect data forwarding being not possible is received at the same time, the NG-RAN does not allocate a data forwarding tunnel identifier.

Another method for the NG-RAN to determine whether to use direct data forwarding or indirect data forwarding is that: data forwarding being not possible received from the AMF means that indirect data forwarding is not possible, the target NG-RAN determines whether to use direct data forwarding or indirect data forwarding according to the received information that direct data forwarding is available; direct data forwarding is used if direct data forwarding is available, and indirect data forwarding is used if direct data forwarding is not feasible and indirect data forwarding being not possible is not received. If direct data forwarding is not feasible and indirect data forwarding being not feasible is received, the NG-RAN does not allocate a data forwarding tunnel identifier.

Another method for the NG-RAN to determine whether to use direct data forwarding or indirect data forwarding is that: if the NG-RAN does not receive that data forwarding is not possible, the target NG-RAN determines whether to use direct data forwarding or indirect data forwarding according to the received information that direct data forwarding is available; direct data forwarding is used if direct data forwarding is available, and indirect data forwarding is used if direct data forwarding is not feasible. If data forwarding is not feasible, the NG-RAN does not allocate a data forwarding tunnel identifier.

If it is direct data forwarding, for a QoS flow accepted for data forwarding or a E-RAB accepted for data forwarding by the NG-RAN, the NG-RAN allocates the downlink data forwarding tunnel information to the respective E-RAB, and the E-RAB identifier and the downlink tunnel information for the E-RAB allocated by the NG-RAN are included in the handover request acknowledgement message. If it is indirect data forwarding, for the QoS flow accepted for data forwarding by the NG-RAN, the NG-RAN allocates the downlink data forwarding tunnel information for the PDU session to which the QoS flow belongs; the PDU session identifier and the downlink tunnel information corresponding to PDU session allocated by the NG-RAN are included in the handover request acknowledgement message, and the QoS flow list accepted for data forwarding may be further included in the handover request acknowledgement message. If data forwarding is not feasible, the NG-RAN does not need to allocate data forwarding tunnel information.

3) the PDU session information list failed to be setup by the NG-RAN. The PDU session information list includes the PDU session identifier and the reason for not accepting.

The message includes information of direct data forwarding or indirect data forwarding. The information may be explicit or implicit. The implicit manner is that, if the data forwarding tunnel information included in the message corresponds to each E-RAB, it is direct data forwarding, and if the data forwarding tunnel information included in the message corresponds to each PDU session, it is indirect data forwarding.

Operation 607: the AMF sends an update SM context request message to the SMF. If tunnel information for data forwarding is received from the NG-RAN, the AMF sends the data forwarding tunnel information received from the NG-RAN to the SMF. The AMF sends the tunnel information received from the NG-RAN for data forwarding to the SMF. The AMF sends the information of whether it is direct data forwarding or indirect data forwarding to the SMF. AMF may inform SMF of direct data forwarding, indirect data forwarding or data forwarding in an explicit manner. The AMF may also inform the SMF in an implicit manner, that is, if the SMF receives the data forwarding tunnel information for each E-RAB, it is direct data forwarding, and if the SMF receives the data forwarding tunnel information for each PDU session, it is indirect data forwarding, and if no data forwarding tunnel information is received, data forwarding is not feasible or data forwarding is not accepted by the target base station. The message includes a PDU session to which the EPS bearer belongs. The message may also include a mapping relationship between an EPS bearer and a QoS flow in the PDU session.

Operation 608: the SMF initiates a session modification process between it and the UPF. If the SMF receives the data forwarding tunnel information of each PDU session, the SMF sends the NG3 interface downlink data forwarding tunnel information allocated by the NG-RAN to the UPF through the N4 session modification process, wherein the data forwarding tunnel information corresponds to each PDU session. The SMF allocates the data forwarding tunnel information between the SGW and the UPF, or the UPF allocates the tunnel information for data forwarding between the SGW and the UPF and sends the tunnel information to the SMF, wherein the data forwarding tunnel information is for each E-RAB. The N4 session modification message includes a PDU session to which the EPS bearer belongs. The N4 session establishment or N4 session modification message may further include a mapping relationship between an EPS bearer and a QoS flow in the PDU session. If the SMF receives the data forwarding tunnel information for an E-RAB, it is direct data forwarding, and the SMF or the UPF does not need to allocate data forwarding tunnel information.

Operation 609: the SMF sends an update SM context response message to the AMF. The SMF sends the tunnel information for data forwarding to the AMF. Corresponding to direct data forwarding, the SMF sends the tunnel information for each E-RAB received from the AMF to the AMF, and the tunnel information for each E-RAB is allocated by the target NG-RAN. Corresponding to indirect data forwarding, the SMF sends the tunnel information for each E-RAB allocated by the SMF or UPF to the AMF, and the tunnel information is used for data forwarding between the SGW and the UPF.

The update SM context response message includes information of whether it is direct data forwarding or indirect data forwarding.

Operation 610: the AMF sends a forward relocation response message to the MME. The message includes data forwarding tunnel information. For direct data forwarding, the tunnel information is allocated by the target NG-RAN. For indirect data forwarding, the tunnel information is tunnel information received from the SMF for data forwarding between the SGW and the UPF. The message includes a target-to-source transparent container. The forward relocation response message includes information of whether it is direct data forwarding or indirect data forwarding.

Operation 611: the MME sends a creating indirect data forwarding tunnel request message to the SGW for indirect data forwarding, if the MME receives the tunnel information for data forwarding. The message is used to send tunnel information for data forwarding between the SGW and the UPF to the SGW. The SGW sends a creating indirect data forwarding tunnel response message to the MME. The message includes uplink tunnel information allocated by the SGW for data forwarding over the S1 interface. For direct data forwarding, this operation is not required to be performed. The MME knows whether it is direct data forwarding or indirect data forwarding according to the information of direct forwarding path availability received from the source base station or information of whether it is direct data forwarding or indirect data forwarding received from the AMF.

Operation 612: the MME sends a handover command message to the E-UTRAN. The message includes a target-to-source transparent container. The message includes the type of handover.

The message includes data forwarding tunnel information. For indirect data forwarding, the tunnel information is allocated by the SGW. For direct data forwarding, the tunnel information is allocated by the target NG-RAN.

Operation 613: the E-UTRAN sends a handover command message to the UE.

The message may also include a mapping relationship between a QoS flow and an EPS bearer in the PDU session, that is, the EPS bearer identifier and/or the mapped QoS information mapped by the QoS flow.

The E-UTRAN forwards data. For the E-RAB for which the data forwarding tunnel information is received, it indicates that the target base station accepts data forwarding, and the E-UTRAN forwards the data to the corresponding tunnel. For direct data forwarding, the target NG-RAN directly receives the data forwarded by the E-UTRAN. For indirect data forwarding, the SGW receives the data forwarded by the E-UTRAN. The SGW forwards the data to the UPF. The SGW forwards data to the UPF for each EPS bearer accepted for data forwarding on the corresponding tunnel. The UPF forwards the data to the NG-RAN. The UPF sends the data, belonging to the same PDU session, received from the SGW on the tunnel for each EPS bearer to the NG-RAN through the corresponding PDU session tunnel, that is, the UPF performs mapping of multiple tunnels to one tunnel. The UPF forwards data to the NG-RAN according to the session transmission manner in the 5GS, for example, through which several QoS flows to send downlink data in each PDU session, and how to set the header of the QoS flow. The UPF adds a QoS flow identifier (QFI) to the packet header forwarded to the target NG-RAN.

The NG-RAN receives the forwarded data from a PDU session tunnel, and the NG-RAN sends the received data to the UE according to an existing manner. The NG-RAN receives the forwarded data from an E-RAB tunnel, and the NG-RAN directly sends the data to the PDCP layer of the corresponding DRB with no need for SDAP layer processing. Based on the mapping relationship between an E-RAB ID(s) and a QoS Flow ID(s) received in the handover request message, the NG-RAN knows the DRB corresponding to the E-RAB, and directly sends the received forwarded data to the PDCP entity of the corresponding DRB. The NG-RAN first sends the forwarded data to the UE, and then sends the data received from a new NG-U to the UE.

During the establishment of the PDU session or the establishment of the EPS bearer, the UE receives the QoS information of the QoS flow mapped by the EPS bearer and/or the QoS flow information from the network. The UE establishes the correspondence between the ongoing EPS bearer and the QoS flow included in the handover command message. For an EPS bearer that does not have a corresponding QoS flow, the UE may delete it.

Alternatively, the UE obtains the mapping relationship between a QoS flow and an EPS bearer in the PDU session from the handover command message. The UE establishes the correspondence between the ongoing EPS bearer and the QoS flow included in the handover command message. For an EPS bearer that does not have a corresponding QoS flow, the UE may delete it.

Operation 614: the UE sends a handover complete message to the NG-RAN.

Operation 615: the NG-RAN sends a handover notify message to the AMF. The message includes the tunnel information allocated by the NG-RAN for downlink data transmission.

Operation 616: the AMF sends an update SM context request message to the SMF.

Operation 617: the SMF sends a N4 session modification message to the UPF. The UPF sends the N4 session modification response message to the SMF.

The AMF sends the tunnel information allocated by the NG-RAN for downlink data transmission to the UPF through the AMF.

Operation 618: the SMF sends an update SMF context response message to the AMF.

As such, the description of the second handover method of the application is completed, and the problem of coexistence of different data forwarding methods when the UE moves between the EPS and the 5G system is completely solved by the method, thereby avoiding data loss, ensuring service continuity and interoperability of different equipment from different vendors, and reducing configuration by operator.

Figure 7:
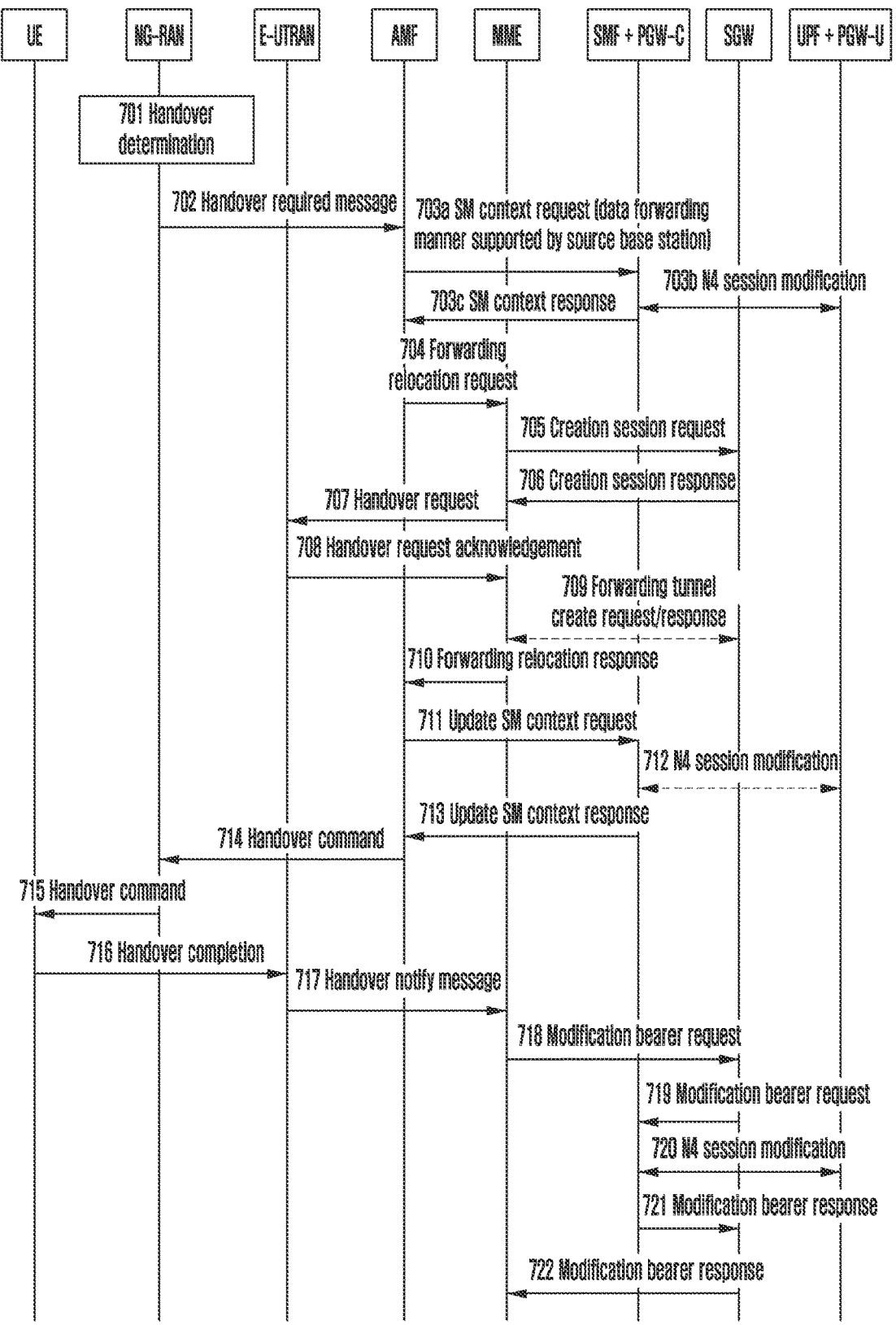
FIG. 7 shows a schematic diagram of a third method for supporting handover according to an embodiment of the disclosure.

The third method for supporting handover according to the application is shown in FIG. 7.

FIG. 7 shows a schematic diagram of a third method for supporting handover according to an embodiment of the disclosure.

Referring to FIG. 7, the method is applicable to the second manner in which two data forwarding methods coexist, that is, which the data forwarding method is specifically supported depends on the implementation of the NG-RAN node and the UPF. This method is used for handover from 5GS to EPS. Detailed descriptions of operations unrelated to the embodiment are omitted herein. The method includes the operations of:

Operation 701: the NG-RAN determines to hand over the UE to the E-UTRAN.

The E-UTRAN herein may be an eNB connected to the EPC. The NG-RAN may be a gNB or a centralized unit CU in a gNB or an eNB connected to the 5GC.

The user plane path before handover is UPF to NG-RAN. The SGW needs to support an interface to connect with the UPF. The UPF may include the function of the PGW user plane to perform the function of the user plane anchor node during the handover between different RATs.

The UE has one or more PDU sessions in progress. Each PDU session includes one or more QoS flows. In a PDU session establishment process or a guaranteed business rate (GBR) QoS flow establishment process, the mapped EPS QoS information and/or the EPS bearer identifier are allocated for the QoS flow. The non-guaranteed business rate (non-GBR) QoS flow is mapped to a default EPS bearer. The GBR QoS flow is mapped to an EPS dedicated bearer. The EPS QoS information mapped to the QoS flow may be allocated by the PCC or SMF. The EPS bearer identifier mapped to the QoS flow may be allocated by the SMF or AMF. For supporting the handover between different systems, the SMF may have the function of the PGW control plane. In the scene of deploying the PCC, the policy control function (PCF) provides the EPS QoS mapped to QoS flow to the SMF. In order to support handover between different systems, the PCF may also have a policy control and charging rules function (PCRF). The SMF sends the EPS QoS information and/or EPS bearer identifier mapped to the QoS flow to the UE through the AMF, for example, sending them through a non-access layer message PDU session establishment message to the UE. During the PDU session establishment or guaranteed business rate (GBR) QoS flow establishment process, the SMF may also send the EPS QoS information and/or E-RAB identifier mapped to the QoS flow to the NG-RAN through the AMF. The AMF sends the EPS QoS information and/or E-RAB identifier mapped to the QoS flow to the NG-RAN through an initial context establishment request message or a PDU session resource establishment request message. The NG-RAN may send the EPS QoS information and/or E-RAB identifier mapped to the QoS flow to the UE through an RRC message. The E-RAB and EPS bearer are the same or one-to-one correspondence, which are referred to as an EPS bearer in the core network, and are referred to as an E-RAB in the access network. The E-RAB identifier and the EPS bearer identifier are the same or one-to-one correspondence, which are referred to as an EPS bearer identifier in the core network, and are referred to as an E-RAB identifier in the access network.

Operation 702: the NG-RAN sends the handover required message to the AMF. The message includes the identifier of the target eNB, a source-to-target transparent container. The source-to-target transparent container includes an E-RAB identifier and downlink data forwarding proposed for the E-RAB. The NG-RAN obtains the EPS bearer identifier mapped to the QoS flow in the PDU session through the PDU session establishment process or through the handover process, as well may obtain the mapped EPS QoS information. The NG-RAN determines whether to propose data forwarding according to the mapping of QoS flow to E-RAB and the QoS information, and the NG-RAN may consider other factors such as whether there is buffered data to determine whether to propose data forwarding, without affecting the main concept of the application. The message also includes that source NG-RAN node supports data forwarding of the PDU session tunnel and/or data forwarding of the E-RAB tunnel. The message includes the information of direct data forwarding path availability. Direct data forwarding may also implicitly inform the AMF that data forwarding of the E-RAB tunnel is supported by the source NG-RAN.

Herein, the AMF obtains, through a UE-specific message, the data forwarding method supported by the NG-RAN node. Another method for the AMF to obtain the NG-RAN node supporting data forwarding of the PDU session tunnel and/or data forwarding of the E-RAB tunnel is through a common process (non-UE-specific process), i.e. AMF obtains the data forwarding method supported by the NG-RAN through the NG establishment process. Corresponding to this method, the information of NG-RAN node supporting data forwarding of the PDU session tunnel and/or data forwarding of the E-RAB tunnel is included in the NG establishment request message sent by the NG-RAN to the AMF. The AMF saves the received information and uses the information when needing to hand over the UE out of the NG-RAN node. The AMF sends an NG establishment response message to the NG-RAN node.

The message further includes identifier information indicating the MME to which the target eNB is connected. The identifier information may be a tracking area identifier or an MME identifier.

The message also includes the handover type.

Operation 703a: the AMF sends a session management (SM) context request message to the SMF. Based on the information received in the handover required message, the AMF knows that the handover is a handover between different systems, and the AMF requests the SMF to provide the SM context. The AMF may also request an EPS bearer context. The AMF sends the message to each SMF serving the UE. The message also includes that source NG-RAN node supports data forwarding of the PDU session tunnel and/or data forwarding of the E-RAB tunnel. The message includes information of direct data forwarding path availability. Direct data forwarding may also implicitly inform the SMF that data forwarding of the E-RAB tunnel is supported by the source NG-RAN.

Operation 703b: the SMF sends an N4 session modification request message to the UPF. The message also includes that source NG-RAN node supports data forwarding of the PDU session tunnel and/or data forwarding of the E-RAB tunnel. The message includes the information of direct data forwarding path availability. Direct data forwarding may also implicitly inform the UPF that data forwarding of the E-RAB tunnel is supported by the source NG-RAN. The UPF sends the N4 session modification response message to the SMF.

Operation 703c: the SMF sends an SM context response message to the AMF. The message includes the SM context of the UE. The SM context also includes the mapped EPS bearer context, such as EPS bearer identifier and/or the EPS QoS information. If the SMF has the mapped EPS bearer context, the SMF always feeds back the mapped EPS bearer context along with the SM context to the AMF at the same time when the AMF requests the SM context. Alternatively, the SMF sends the mapped EPS bearer context to the AMF along with the SM context, only when the AMF requests the SM context and also requests the mapped EPS bearer context to the SMF.

Operation 704: the AMF sends a forward relocation request message to the MME. The AMF selects and finds the MME according to the identifier information of the MME connected to the target eNB included in the handover required message. The identifier information of the MME connected to the target eNB may be a TAI. The message includes an identifier of the target eNB, a source-to-target transparent container, and the mapped EPS UE context information. The mapped EPS UE context information includes UE mobile management (MM) context information and session SM context information.

If the AMF does not receive information of direct data forwarding path availability from the source NG-RAN, the AMF determines whether indirect data forwarding is feasible. If direct data forwarding is feasible, direct data forwarding is used. Or, if direct data forwarding is feasible and the source base station supports data forwarding of E-RAB tunnel, direct data forwarding is used. The AMF informs the MME whether direct data forwarding, indirect data forwarding, or data forwarding is not possible.

Operation 705: the MME sends a creation session request message to the SGW. The message includes EPS bearer context information.

Operation 706: the SGW sends a creation session response message to the MME. The message includes tunnel information for an S1 interface to send uplink data allocated by the SGW.

Operation 707: the MME sends a handover request message to the E-UTRAN. The message includes a source-to-target transparent container and E-EAB context. The E-RAB context includes the E-RAB to be established and uplink tunnel information of the S1 interface allocated by the SGW. The E-RAB context includes information of whether data forwarding is possible. The message includes the handover type, and the specific content thereof is the same as that in operation 702, which details are not described herein again.

Operation 708: the E-UTRAN sends a handover request acknowledgement message to the MME. The message includes the established E-RAB list and the E-RAB list failed to be established, as well as the target-to-source transparent container. Corresponding to the established E-RAB, the tunnel information for downlink data transmission of the S1 interface is further included. Corresponding to the established E-RAB, if the source base station proposes the downlink data forwarding, data forwarding is possible and the target eNB accepts the downlink data forwarding, the target base station includes the tunnel information for data forwarding of the S1 interface allocated by the E-UTRAN for each E-RAB accepted for downlink data forwarding.

Operation 709: the MME requests the SGW to create an indirect data forwarding tunnel. This operation is performed only when indirect data forwarding is applied. If the MME receives the downlink tunnel information for data forwarding of the S1 interface from the E-UTRAN, the MME requests the SGW to create an indirect data forwarding tunnel. The MME sends the transport layer address and TEID allocated by the eNB for data forwarding to the SGW. The transport layer address and TEID correspond to each E-RAB.

The SGW sends an indirect data forwarding tunnel creation response message to the MME. The message includes the information allocated by the SGW for data forwarding between the SGW and the UPF. The information used for data forwarding between the SGW and the UPF includes an E-RAB identifier and tunnel information used by the E-RAB for data forwarding. The tunnel information includes a transport layer address and a TEID allocated by the SGW. The SGW allocates downlink data forwarding tunnel information for the E-RAB accepted for downlink data forwarding. The SGW allocates uplink data forwarding tunnel information for the E-RAB accepted for uplink data forwarding. The data forwarding tunnel information included in the E-RAB information may include uplink and/or downlink data forwarding tunnel information.

Operation 709 is performed when indirect data forwarding is feasible.

Operation 710: the MME sends a forward relocation response message to the AMF. The message includes tunnel information for data forwarding. For direct data forwarding, the data forwarding tunnel information is received from the target base station by the MME. For indirect data forwarding, the tunnel information is allocated by the SGW and is received by the MME from the SGW. The tunnel information corresponds to each EPS bearer. The tunnel information of data forwarding may include downlink and/or uplink data forwarding tunnel information. The message includes a target-to-source transparent container.

The MME directly sends the E-RAB information to the AMF, and the AMF performs the conversion.

Operation 711: the AMF sends an update SM context request message to the SMF. The message includes the information of direct data forwarding or indirect data forwarding. The AMF requests the SMF to create a data forwarding tunnel. For indirect data forwarding, the AMF requests the SMF to create a data forwarding tunnel. The message includes PDU session information. The PDU session information includes a PDU session identifier, a QoS flow information included in the PDU session, the EPS bearers needing data forwarding in the EPS system in each PDU session, a mapping relationship between a QoS flow and an EPS bearer, an EPS bearer identifier and/or QoS information of the EPS bearer. The message includes information received from the MME for data forwarding. The message also includes that the source NG-RAN node supports data forwarding of the PDU session tunnel and/or data forwarding of the E-RAB tunnel.

Operation 712: the SMF sends an N4 session modification message to the UPF. The message includes PDU session information. The PDU session information includes a PDU session identifier, a QoS flow information included in the PDU session, the EPS bearers needing data forwarding in the EPS system in each PDU session, a mapping relationship between a QoS flow and an EPS bearer, and an EPS bearer identifier and/or QoS information of the EPS bearer. The message includes information received from the AMF for data forwarding. The message includes the information of direct data forwarding or indirect data forwarding.

The N4 session modification message includes EPS bearer information included in the PDU session. The EPS bearer information includes an EPS bearer identifier and tunnel information used by the EPS bearer for data forwarding. The SMF informs the UPF the correspondence between a QoS flow and an EPS bearer in the PDU session. The UPF knows the QoS flow information of the PDU session in the 5G system. The UPF receives the EPS bearer information and the mapping relationship between a QoS flow and an EPS bearer in the PDU session, from the SMF.

The message also includes that source NG-RAN node supports data forwarding of the PDU session tunnel and/or data forwarding of the E-RAB tunnel.

For indirect data forwarding, the SMF allocates tunnel information for data forwarding between the NG-RAN and the UPF, or the UPF allocates tunnel information for data forwarding between the NG-RAN and the UPF and sends it to the SMF. If the source NG-RAN supports data forwarding of the PDU session tunnel, the UPF allocates the data forwarding tunnel information for the PDU session corresponding to the EPS bearer accepted for data forwarding. If the source NG-RAN node supports data forwarding of the E-RAB tunnel, the UPF allocates the data forwarding tunnel information for the EPS bearer accepted for data forwarding. If the source NG-RAN node supports data forwarding of the PDU session tunnel and data forwarding of the E-RAB tunnel, the UPF determines to allocate the data forwarding tunnel information for each PDU session or for each E-RAB. The tunnel information includes a transport layer address and a TEID.

The UPF sends the allocated tunnel information for data forwarding to the SMF. The SMF receives the N4 session modification response message from the UPF. The message includes tunnel information allocated by the UPF for data forwarding between the NG-RAN and the UPF. For direct data forwarding, the UPF does not need to allocate data forwarding tunnel information. According to the information received in operation 703 or in this operation, the UPF knows whether it is direct data forwarding or indirect data forwarding. For direct data forwarding, operation 712 may also not be performed.

Operation 713: the SMF sends an update SM context response message to the AMF. For direct data forwarding, the message includes tunnel information for data forwarding, received by the SMF from the AMF. The tunnel information is used for direct data forwarding, and is for each EPS bearer. For indirect data forwarding, the message includes tunnel information allocated by the SMF or UPF for data forwarding between the NG-RAN and the UPF. The tunnel information may be for each PDU session or each E-RAB.

Operation 714: the AMF sends a handover command message to the NG-RAN. The message includes a target-to-source transparent container, tunnel information for data forwarding allocated by E-UTRAN or UPF or SMF. The tunnel information for data forwarding is for each PDU session or each E-RAB. For direct data forwarding, the tunnel information for data forwarding is for each E-RAB for which data forwarding is accepted. For indirect data forwarding, the tunnel information for data forwarding is for each PDU session to which the QoS flow accepted for data forwarding belongs. The message further includes established PDU session information and PDU session information that is not successfully established. The established PDU session information includes the established QoS flow information and the QoS flow information that is note successfully established.

Operation 715: the NG-RAN sends a handover command message to the UE.

The NG-RAN forwards the data.

If the NG-RAN receives the tunnel information for each PDU session, the NG-RAN forwards the data to the UPF. The NG-RAN forwards data of QoS flows accepted for data forwarding to the UPF on the tunnel for the corresponding PDU session. The NG-RAN sends the data of each QoS flow to the UPF on the user plane tunnel allocated for the PDU session. For the downlink data, the NG-RAN sends downlink packets to the UPF on the tunnel allocated for downlink data forwarding. The UPF forwards the data to the SGW. The UPF adds the QFI corresponding to the QoS flow to the packet header, and forwards the data received from the NG-RAN to the SGW through the user plane tunnel allocated for the mapped EPS bearer. The UPF forwards the data of different QoS flows in the PDU session to the SGW through the user plane tunnel allocated for the mapped EPS bearer according to the mapping relationship between a QoS flow and an EPS bearer. According to the mapping relationship between a QoS flow and an EPS bearer and the EPS bearer information accepted for data forwarding, the UPF knows the QoS flow accepted for data forwarding, and the UPF forwards the data of the QoS flow accepted for data forwarding to the SGW through the user plane tunnel allocated for the mapped EPS bearer. Corresponding to the QoS flow that not accepted for data forwarding, there is no corresponding data forwarding tunnel, and the UPF discards the data.

If the NG-RAN receives the tunnel information for each E-RAB, the NG-RAN forwards the data of the QoS flow to the respective E-RAB tunnel. The NG-RAN forwards the PDCP Service Data Unit (SDU) to the respective E-RAB tunnel. The PDCP SDU does not have a sequence number (SN). For indirect data forwarding, the data is sent to the UPF, and the UPF forwards the data to the SGW. For direct data forwarding, the data is sent directly to the target base station.

The SGW forwards the data to the E-UTRAN. The SGW sends the data received from the tunnel for each EPS bearer from the UPF to the E-UTRAN through the corresponding tunnel allocated by the E-UTRAN. The SGW forwards the data to the E-UTRAN according to the session transmission mode in the EPS.

The E-UTRAN receives the forwarded data from the E-RAB tunnel, and the E-UTRAN first sends the forwarded data to the UE, and then sends the data received from the new S1-U to the UE.

During the establishment of the PDU session or the establishment of the GBR QoS flow, the UE receives the EPS QoS information and/or the EPS bearer identifier information mapped to the QoS flow from the network. The UE associates the ongoing QoS flow and the EPS bearer identifier included in the handover command message to establish a correspondence therebetween. For the QoS flow without corresponding to EPS bearer, the UE may delete it.

Operation 716: the UE sends a handover complete message to the E-UTRAN.

Operation 717: the E-UTRAN sends a handover notify message to the MME. The message includes tunnel information allocated by the E-UTRAN for downlink data transmission.

Operation 718: the MME sends a modification bearer request message to the SGW. The message includes tunnel information used by the S1 interface for downlink data transmission.

Operation 719: the SGW sends a modification bearer request message to the SMF. The SMF may further have the function of the PGW control plane. The SGW allocates tunnel information for downlink data transmission between the SGW and the UPF, wherein the tunnel information corresponds to each EPS bearer or each PDU session.

Operation 720: the SMF request a UPF session modification. The SMF may further have the function of the PGW control plane. The SMF sends the tunnel information for the downlink data transmission between the SGW and the UPF allocated by the SGW to the UPF, wherein the tunnel information corresponds to each EPS bearer or each PDU session. The UPF sends a session modification response to the SMF. The UPF allocates tunnel information for uplink data transmission between the SGW and the UPF, and the UPF sends the tunnel information for the uplink data transmission to the SMF.

Operation 721: the SMF sends a modification bearer response message to the SGW. The message includes tunnel information for uplink data transmission between the SGW and the UPF, which the information is allocated by the UPF.

Operation 722: the SGW sends a modification bearer response message to the MME.

As such, the description of the third handover method of the application is completed, and the problem of data forwarding during the UE moving between the EPS and the 5GS system is completely solved by the method when equipment from different vendors support different methods for data forwarding, thereby avoiding data loss, ensuring service continuity and interoperability of different equipment from different vendors, and reducing configuration by operator.

Figure 8:
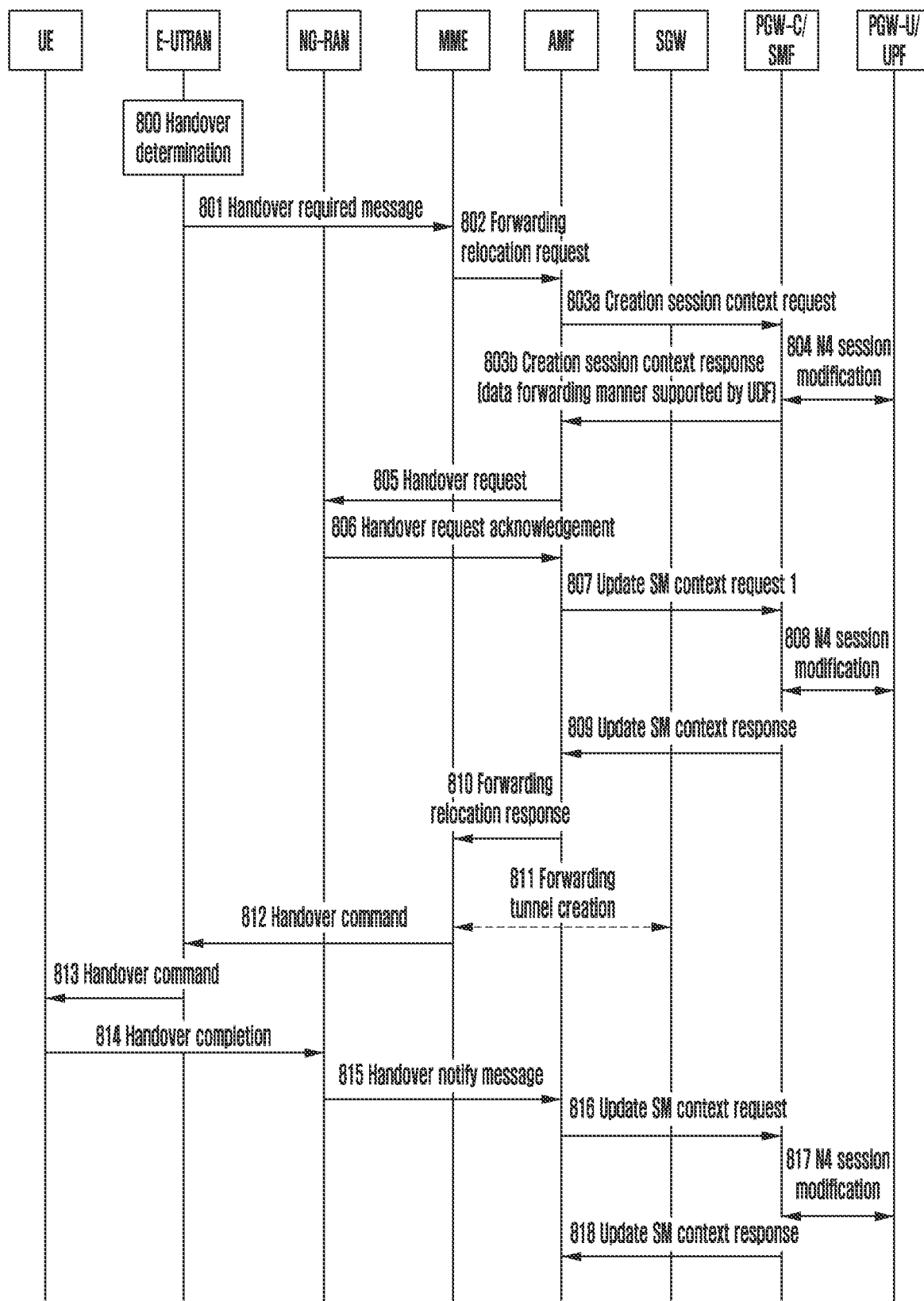
FIG. 8 is a schematic diagram of a fourth method for supporting handover according to an embodiment of the disclosure.

The fourth method for supporting handover according to the application is shown in FIG. 8.

FIG. 8 is a schematic diagram of a fourth method for supporting handover according to an embodiment of the disclosure.

Referring to FIG. 8, the method is applicable to the second manner in which two data forwarding methods coexist, that is, which data forwarding method is specifically supported depends on the implementation of the NG-RAN node and the UPF. This method is used for the handover from EPS to 5GS Detailed descriptions of operations unrelated to the embodiment are omitted herein. This method includes the operations of:

Operation 800: the E-UTRAN determines to hand over a UE to an NG-RAN.

Here, the E-UTRAN may be an eNB connected to the EPC. The NG-RAN may be a gNB, or a central unit (CU) in the eNB or gNB connected to the 5GC. The eNB connected to the 5GC may also be referred to as an ng-eNB.

The user plane path before handover is PGW-U+UPF (the UPF having the function of the PGW user plane, hereinafter referred to as UPF), the SGW to the E-UTRAN. The SGW needs to support the interface to connect with PGW-U+UPF. The UE has one or more PDU sessions in progress. Each PDU session includes one or more EPS bearers. In a PDU session establishment process or an EPS bearer establishment process, the mapped QoS information and/or the QoS flow identifier of the QoS flow are allocated for the EPS bearer. The default EPS bearer is mapped to a non-guaranteed business rate (non-GBR) QoS flow. The QoS information and/or the QoS flow identifier of the QoS flow mapped to the EPS bearer may be allocated by the function of the PCC or the PGW control plane. In order to support handover between different systems, the function of the PGW control plane may further have an SMF function. In the scene of deploying the PCC, the policy control and charging rules function (PCRF) provides the QoS information and/or QoS flow identifier of the QoS flow mapped to the EPS bearer to the SMF. In order to support handover between different systems, the PCRF may also have a policy control function (PCF). The SMF sends the QoS information and/or QoS identifier of the QoS flow mapped to the EPS bearer to the UE through the MME, for example, sending them to the UE through a non-access layer message PDN connection establishment message. During the PDU session establishment process or the EPS bearer establishment process, the SMF may also send the QoS information and/or QoS flow identifier of the QoS flow mapped to the EPS bearer to the E-UTRAN through the MME. The E-UTRAN may send the mapping information to the UE through an RRC message. The E-RAB and EPS bearer identifiers are the same or one-to-one correspondence, which are referred to as an EPS bearer in the core network, and are referred to as an E-RAB in the access network. The E-RAB identifier and the EPS bearer identifier are the same or one-to-one correspondence, which are referred to as an EPS bearer identifier in the core network, and are referred to as an E-RAB identifier in the access network.

Operation 801: the E-UTRAN sends a handover required message to the MME. The message includes the identifier of the target NG-RAN node, and a source-to-target transparent container. The message also includes identifier information indicating the AMF to which the target NG-RAN node is connected. The identifier information may be a tracking area identifier, a network sharding identifier, an AMF pool identifier, an AMF identifier or the like.

The message includes information of direct data forwarding path availability.

The source-to-target transparent container includes a PDU session identifier, an identifier of the QoS flow in the PDU session, and the downlink data forwarding proposed for the QoS flow. The eNB obtains the PDU session identifier corresponding to the EPS bearer and/or the QoS flow identifier in the PDU session through the PDN connection establishment process or through the handover process. It is also possible to obtain the QoS information of the mapped QoS flow. The eNB determines whether to propose data forwarding according to the E-RAB to PDU session or according to the mapping of the QoS flow in the E-RAB to the PDU session and the QoS information, and the eNB may consider other factors such as whether there is buffered data to determine whether to propose data forwarding, without affecting the main content of the application.

Operation 802: the MME sends a forward relocation request message to the AMF. The MME selects and finds the AMF according to the identifier information of the AMF to which the target NG-RAN node is connected, which the information is included in the handover required message. The message includes the identifier of the target NG-RAN node, the source-to-target transparent container and the UE context information. The UE context information includes UE mobile management (MM) context information and a session management context. The message includes the handover type.

The MME sends a direct forwarding indication to the AMF. If the MME doesn't receives direct data forwarding path availability from the source E-UTRAN, the MME determines whether indirect data forwarding is possible. The MME informs the AMF of the information of whether direct data forwarding or indirect data forwarding. The MME may also inform AMF of the information of data forwarding being not possible. Data forwarding being not possible means that both direct data forwarding and indirect data forwarding are not possible.

Operation 803*a*: the AMF sends a creation session (SM) context request message to the SMF. The AMF converts the received EPS UE context into a 5GS UE context. The AMF may also exchange with the PCRF to obtain the converted 5GS UE context. The AMF selects the SMF that serves the UE.

According to the information received in the forward relocation request message, the AMF knows that the handover is a handover between different systems, and the AMF requests the SMF to provide the SM context. The AMF sends the message to each SMF serving the UE.

The AMF sends the direct forwarding indication to the SMF, and the AMF informs the SMF the information of whether direct data forwarding or indirect data forwarding is available.

The AMF informs the SMF of the information of whether direct data forwarding or indirect data forwarding or data forwarding is not possible.

Operation 804: the SMF initiates an N4 session modification process between it and the UPF. The SMF informs the UPF of the information of whether direct data forwarding or indirect data forwarding. The SMF may also inform UPF that data forwarding is not possible. The UPF informs the SMF of the information of supporting the PDU session tunnel and/or E-RAB tunnel data forwarding. If direct data forwarding is possible and the UPF supports E-RAB tunnel data forwarding, the UPF may inform the SMF of the information of supporting the E-RAB tunnel data forwarding. If data forwarding is not possible, UPF may not need to inform the SMF which manner of data forwarding is supported. If indirect data forwarding is possible, the UPF informs the SMF of the information of data forwarding manner supported by the UPF actually, such as the PDU session tunnel and/or E-RAB tunnel data forwarding.

Operation 803b: the SMF sends a creation session context response message to the AMF. The message includes the SM context of the UE. The SM context also includes a mapping relationship between an EPS bearer and a QoS flow in the PDU session. If the SMF has the mapped EPS bearer context, the SMF always feeds back the mapped EPS bearer context together with the SM context to the AMF at the same time when the AMF requests the SM context. Alternatively, the SMF sends the mapped EPS bearer context to the AMF only when the AMF requests the mapped EPS context at the same time.

The 5GS UE context includes QoS information in the 5G system. The QoS information in the 5G system includes a QoS rule and/or a QoS profile. The AMF may map EPS QoS information into 5G QoS information, or the AMF interacts with the 5G policy control function (5G-PCF) to derive 5G QoS information.

The SMF determines direct data forwarding, indirect data forwarding, or data forwarding not possible. If the direct forwarding indication received by the SMF indicates that direct data forwarding path is available, the SMF determines to use direct data forwarding. If the direct forwarding indication received by the SMF indicates indirect data forwarding and that indirect data forwarding is possible, the SMF determines to use indirect data forwarding. If the direct forwarding indication received by the SMF indicates indirect data forwarding but no indirect data forwarding connectivity between source and target, the SMF determines that data forwarding is not possible. The SMF includes information of direct data forwarding, indirect data forwarding, or data forwarding being not possible in the N2 session management (SM) information container.

The message includes a data forwarding manner supported by the UPF, that is, the information that the UPF supports PDU session tunnel and/or E-RAB tunnel data forwarding.

Operation 805: the AMF sends the handover request message to the NG-RAN. The message includes information of the PDU session to be established. The information of the PDU session includes a session identifier, session QoS information, QoS flow information, uplink tunnel information for each session, and/or a source-to-target transparent container. The message includes the type of handover.

The message includes the information of direct data forwarding, indirect data forwarding, or data forwarding being not possible. The above information may be included in a N2 SM information container.

The message includes a data forwarding manner supported by the UPF, that is, information that the UPF supports PDU session tunnel and/or E-RAB tunnel data forwarding.

The message may also include a mapping relationship between a QoS flow and an EPS bearer in the PDU session, that is, the E-RAB identifier mapped by the QoS flow and/or the mapped QoS information.

Operation 806: the NG-RAN sends a handover request acknowledgement message to the AMF. The message includes one or more of the following information:

1) the target-to-source transparent container. The target-to-source transparent container may further include a mapping relationship between a QoS flow and an EPS bearer in the PDU session, that is, the EPS bearer identifier mapped by the QoS flow and/or the mapped QoS information.

2) the established PDU session information list accepted by the NG-RAN. The PDU session information list includes a PDU session identifier, downlink tunnel information of the NG3 interface used for the PDU session, QoS flow information accepted by the PDU session, and unaccepted QoS flow information.

If the NG-RAN and the UPF support the E-RAB tunnel data forwarding, for a QoS flow accepted for data forwarding or a E-RAB accepted for data forwarding by the NG-RAN, the NG-RAN allocates the downlink data forwarding tunnel information to the respective E-RAB, and the E-RAB identifier and the downlink tunnel information for the E-RAB allocated by the NG-RAN are included in the handover request acknowledgement message. If the NG-RAN and the UPF support the PDU session tunnel data forwarding, for the QoS flow accepted for data forwarding by the NG-RAN, the NG-RAN allocates the downlink data forwarding tunnel information for the PDU session to which the QoS flow belongs; the PDU session identifier and the downlink tunnel information corresponding to PDU session allocated by the NG-RAN are included in the handover request acknowledgement message, and the QoS flow list accepted for data forwarding may be further included in the handover request acknowledgement message. If both the NG-RAN and the UPF support two data forwarding manners (PDU session tunnel data forwarding manner and E-RAB data forwarding), the NG-RAN may determine to allocate which manner of data forwarding tunnel, and then the corresponding data forwarding tunnel information is included in the handover request acknowledgement message by the NG-RAN. If data forwarding is not possible, the NG-RAN does not need to allocate data forwarding tunnel information. For direct data forwarding, only E-RAB tunnel for data forwarding may be used, which is available when both the NG-RAN and the UPF support the E-RAB tunnel data forwarding.

3) the PDU session information list failed to be setup by the NG-RAN. The PDU session information list includes the PDU session identifier and the reason for not accepting.

Operation 807: the AMF sends an update SM context request message to the SMF. If tunnel information for data forwarding is received from the NG-RAN, the AMF sends the data forwarding tunnel information received from the NG-RAN to the SMF. The AMF sends the tunnel information received from the NG-RAN for data forwarding to the SMF. The AMF sends the information of whether it is direct data forwarding or indirect data forwarding to the SMF. AMF may inform SMF of direct data forwarding or indirect data forwarding in an explicit manner. The AMF may also inform the SMF in an implicit manner, that is, if the SMF receives the data forwarding tunnel information for each E-RAB, it is direct data forwarding, and if the SMF receives the data forwarding tunnel information for each PDU session, it is indirect data forwarding, and if no data forwarding tunnel information is received, data forwarding is not feasible or data forwarding is not accepted by the target base station. The message includes a PDU session to which the EPS bearer belongs. The message may also include a mapping relationship between an EPS bearer and a QoS flow in the PDU session.

Operation 808: the SMF initiates a session modification process between it and the UPF. The SMF sends the information of whether direct data forwarding or indirect data forwarding to the UPF. the SMF sends the NG3 interface downlink data forwarding tunnel information allocated by the NG-RAN to the UPF through the N4 session modification process, wherein the data forwarding tunnel information corresponds to each PDU session or each EPS bearer. The SMF allocates the data forwarding tunnel information between the SGW and the UPF, or the UPF allocates the tunnel information for data forwarding between the SGW and the UPF and sends the tunnel information to the SMF, wherein the data forwarding tunnel information is for each E-RAB. The N4 session modification message includes a PDU session to which the EPS bearer belongs. The N4 session establishment or N4 session modification message may further include a mapping relationship between an EPS bearer and a QoS flow in the PDU session. For direct data forwarding, the SMF or UPF does not need to allocate the data forwarding tunnel information. According to the information received in operation 803 or in this operation, the UPF knows whether it is direct data forwarding or indirect data forwarding. Corresponding to the implicit manner, if the SMF receives the data forwarding tunnel information for each E-RAB, it is direct data forwarding.

Operation 809: the SMF sends an update SM context response message to the AMF. The SMF sends the tunnel information for data forwarding to the AMF. Corresponding to direct data forwarding, the SMF sends the tunnel information for each E-RAB received from the AMF to the AMF, and the tunnel information for each E-RAB is allocated by the target NG-RAN. Corresponding to indirect data forwarding, the SMF sends the tunnel information for each E-RAB allocated by the SMF or UPF to the AMF, and the tunnel information is used for data forwarding between the SGW and the UPF.

Operation 810: the AMF sends a forward relocation response message to the MME. The message includes data forwarding tunnel information. For direct data forwarding, the tunnel information is allocated by the target NG-RAN. For indirect data forwarding, the tunnel information is tunnel information received from the SMF for data forwarding between the SGW and the UPF. The message includes a target-to-source transparent container.

Operation 811: the MME sends a creating indirect data forwarding tunnel request message to the SGW for indirect data forwarding, if the MME receives the tunnel information for data forwarding. The message is used to send tunnel information for data forwarding between the SGW and the UPF to the SGW. The SGW sends a creating indirect data forwarding tunnel response message to the MME. The message includes uplink tunnel information allocated by the SGW for data forwarding of the S1 interface. For direct data forwarding, this operation is not required to be performed.

Operation 812: the MME sends a handover command message to the E-UTRAN. The message includes a target-to-source transparent container. The message includes the type of handover.

The message includes data forwarding tunnel information. For indirect data forwarding, the tunnel information is allocated by the SGW. For direct data forwarding, the tunnel information is allocated by the target NG-RAN.

Operation 813: the E-UTRAN sends a handover command message to the UE.

The message may also include a mapping relationship between a QoS flow and an EPS bearer in the PDU session, that is, the EPS bearer identifier and/or the mapped QoS information mapped by the QoS flow.

The E-UTRAN forwards data. For the E-RAB for which the data forwarding tunnel information is received, it indicates that the target base station accepts data forwarding, and the E-UTRAN forwards the data to the corresponding tunnel. For direct data forwarding, the target NG-RAN directly receives the data forwarded by the E-UTRAN. For indirect data forwarding, the SGW receives the data forwarded by the E-UTRAN. The SGW forwards the data to the UPF. The SGW forwards data to the UPF for each EPS bearer accepted for data forwarding on the corresponding tunnel. The UPF forwards the data to the NG-RAN. According to the data forwarding tunnel information which is allocated by the NG-RAN and received in operation 808, the UPF forwards the data to the NG-RAN through the corresponding tunnel. If the received tunnel is for each PDU session, the UPF sends the data, belonging to the same PDU session, received from the SGW on the tunnel for each EPS bearer to the NG-RAN through the PDU session tunnel, that is, the UPF performs mapping of multiple tunnels to one tunnel. The UPF forwards data to the NG-RAN according to the session transmission manner in the 5GS, for example, through which several QoS flows to send downlink data in each PDU session, and how to set the header of the QoS flow. The UPF adds a QoS flow identifier (QFI) to the packet header forwarded to the target NG-RAN. If the received tunnel is for each E-RAB, the UPF directly forwards the data to the corresponding E-RAB tunnel.

The NG-RAN receives the forwarded data from a PDU session tunnel, and the NG-RAN sends the received data to the UE according to an existing manner. The NG-RAN receives the forwarded data from an E-RAB tunnel, and the NG-RAN directly sends the data to the PDCP layer of the corresponding DRB with no need for SDAP layer processing. Based on the mapping relationship between an E-RAB ID(s) and a QoS Flow ID(s) received in the handover request message, the NG-RAN knows the DRB corresponding to the E-RAB, and directly sends the received forwarded data to the PDCP entity of the corresponding DRB. The NG-RAN first sends the forwarded data to the UE, and then sends the data received from a new NG-U to the UE.

During the establishment of the PDU session or the establishment of the EPS bearer, the UE receives the QoS information of the QoS flow mapped by the EPS bearer and/or the QoS flow information from the network. The UE establishes the correspondence between the ongoing EPS bearer and the QoS flow included in the handover command message. For an EPS bearer that does not have a corresponding QoS flow, the UE may delete it.

Alternatively, the UE obtains the mapping relationship between a QoS flow and an EPS bearer in the PDU session from the handover command message. The UE establishes the correspondence between the ongoing EPS bearer and the QoS flow included in the handover command message. For an EPS bearer that does not have a corresponding QoS flow, the UE may delete it.

Operation 814: the UE sends, a handover complete message to the NG-RAN.

Operation 815: the NG-RAN sends a handover notify message to the AMF. The message includes the tunnel information allocated by the NG-RAN for downlink data transmission.

Operation 816: the AMF sends an update SM context request message to the SMF.

Operation 817: the SMF sends a N4 session modification message to the UPF. The UPF sends the N4 session modification response message to the SMF.

The AMF sends the tunnel information allocated by the NG-RAN for downlink data transmission to the UPF through the AMF.

Operation 818: the SMF sends an update SMF context response message to the AMF.

As such, the description of the fourth handover method of the application is completed, and the problem of data forwarding during the UE moving between the EPS and the 5GS system is completely solved by the method, when equipment from different vendors supports different methods for data forwarding, thereby avoiding data loss, ensuring service continuity and interoperability of different equipment from different vendors, and reducing configuration by operator.

Figure 9:
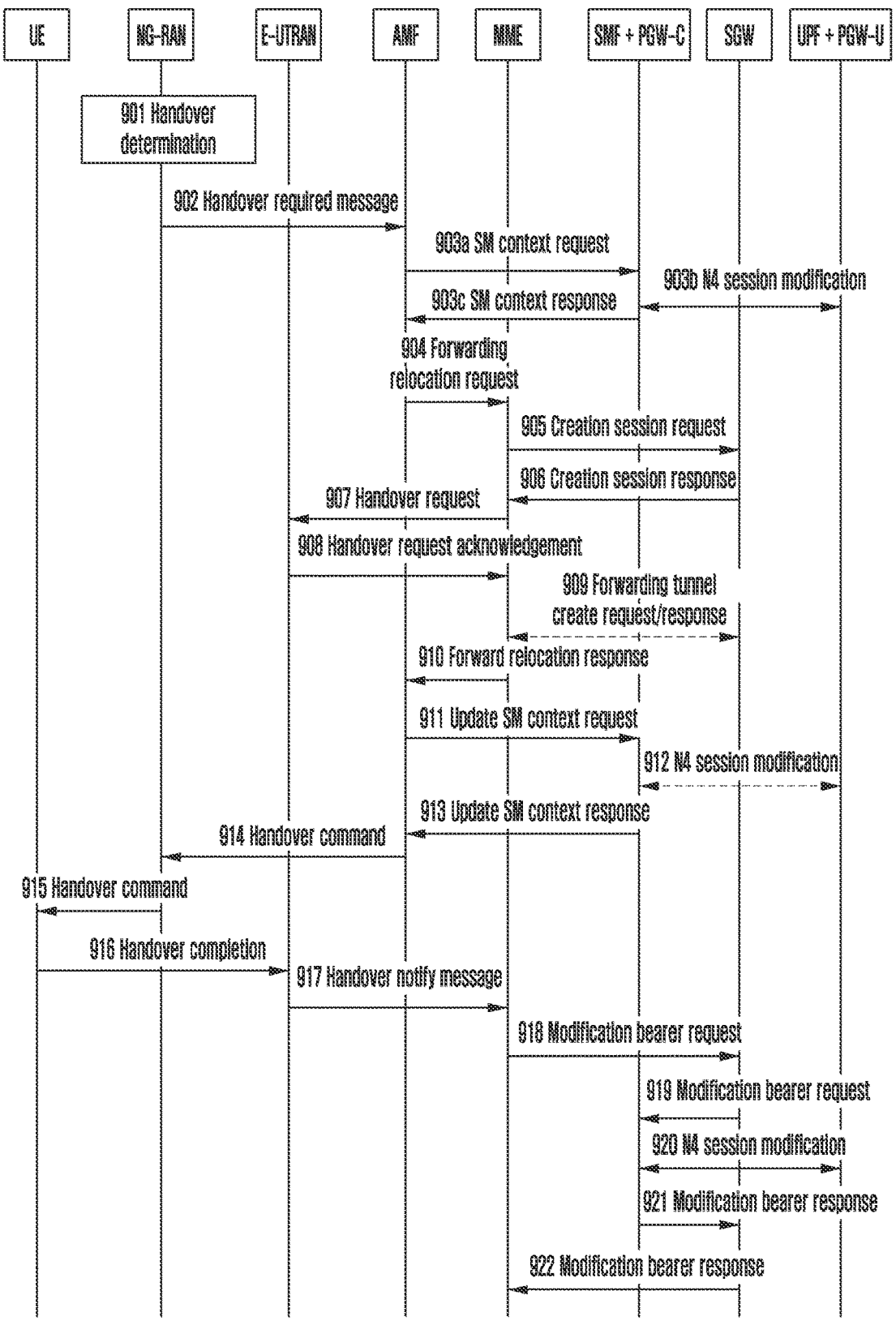
FIG. 9 is a schematic diagram of a fifth method for supporting handover according to an embodiment of the disclosure.

The fifth method for supporting handover in the application is as shown in FIG. 9.

FIG. 9 is a schematic diagram of a fifth method for supporting handover according to an embodiment of the disclosure.

Referring to FIG. 9, this method is applicable to the third manner in which two data forwarding methods coexist, that is, both data forwarding methods are required to be supported. This method is used for handover from 5GS to EPS. Detailed descriptions of operations unrelated to the embodiment are omitted herein. The method includes the operations of:

Operation 901: the NG-RAN determines to hand over the UE to the E-UTRAN.

The E-UTRAN herein may be an eNB connected to the EPC. The NG-RAN may be a gNB or a centralized unit CU in a gNB or an eNB connected to the 5GC.

The user plane path before handover is UPF to NG-RAN. The SGW needs to support an interface to connect with the UPF. The UPF may include the function of the PGW user plane to perform the function of the user plane anchor node during the handover between different RATs.

The UE has one or more PDU sessions in progress. Each PDU session includes one or more QoS flows. In a PDU session establishment process or a guaranteed business rate (GBR) QoS flow establishment process, the mapped EPS QoS information and/or the EPS bearer identifier are allocated for the QoS flow. The non-guaranteed business rate (non-GBR) QoS flow is mapped to a default EPS bearer. The GBR QoS flow is mapped to an EPS dedicated bearer. The EPS QoS information mapped to the QoS flow may be allocated by the PCC or SMF. The EPS bearer identifier mapped to the QoS flow may be allocated by the SMF or AMF. For supporting the handover between different systems, the SMF may have the function of the PGW control plane. In the scene of deploying the PCC, the policy control function (PCF) provides the EPS QoS mapped to QoS flow to the SMF. In order to support handover between different systems, the PCF may also have a policy control and charging rules function (PCRF). The SMF sends the EPS QoS information and/or EPS bearer identifier mapped to the QoS flow to the UE through the AMF, for example, sending them through a non-access layer message PDU session establishment message to the UE. During the PDU session establishment or guaranteed business rate (GBR) QoS flow establishment process, the SMF may also send the EPS QoS information and/or E-RAB identifier mapped to the QoS flow to the NG-RAN through the AMF. The AMF sends the EPS QoS information and/or E-RAB identifier mapped to the QoS flow to the NG-RAN through an initial context establishment request message or a PDU session resource establishment request message. The NG-RAN may send the EPS QoS information or E-RAB identifier mapped to the QoS flow to the UE through an RRC message. The E-RAB and EPS bearer are the same or one-to-one correspondence, which are referred to as an EPS bearer in the core network, and are referred to as an E-RAB in the access network. The E-RAB identifier and the EPS bearer identifier are the same or one-to-one correspondence, which are referred to as an EPS bearer identifier in the core network, and are referred to as an E-RAB identifier in the access network.

Operation 902: the NG-RAN sends the handover required message to the AMF. The message includes the identifier of the target eNB, a source-to-target transparent container. The source-to-target transparent container includes an E-RAB identifier and downlink data forwarding proposed for the E-RAB. The NG-RAN obtains the EPS bearer identifier mapped to the QoS flow in the PDU session through the PDU session establishment process or through the handover process, as well may obtain the mapped EPS QoS information. The NG-RAN determines whether to propose data forwarding according to the mapping of QoS flow to E-RAB and the QoS information, and the NG-RAN may consider other factors such as whether there is buffered data to determine whether to propose data forwarding, without affecting the main concept of the application. The message includes information of direct forwarding path availability.

The message further includes identifier information indicating the MME to which the target eNB is connected. The identifier information may be a tracking area identifier or an MME identifier.

The message also includes the handover type.

Operation 903a: the AMF sends a session management (SM) context request message to the SMF. Based on the information received in the handover required message, the AMF knows that the handover is a handover between different systems, and the AMF requests the SMF to provide the SM context. The AMF may also request an EPS bearer context. The AMF sends the message to each SMF serving the UE. The message includes information of direct data forwarding path availability. The SMF saves information of whether direct data forwarding is feasible.

Operation 903b: the SMF sends an N4 session modification request message to the UPF. The message includes information of direct data forwarding path availability. The UPF saves information of whether direct data forwarding is possible. The UPF sends an N4 session modification response message to the SMF.

Operation 903c: the SMF sends an SM context response message to the AMF. The message includes the SM context of the UE. The SM context also includes the mapped EPS bearer context, such as EPS bearer identifier and/or the EPS QoS information. If the SMF has the mapped EPS bearer context, the SMF always feeds back the mapped EPS bearer context along with the SM context to the AMF at the same time, when the AMF requests the SM context. Alternatively, the SMF sends the mapped EPS bearer context to the AMF along with the SM context, only when the AMF requests the SM context and also requests the mapped EPS bearer context to the SMF.

Operation 904: the AMF sends a forward relocation request message to the MME. The AMF selects and finds the MME according to the identifier information of the MME connected to the target eNB included in the handover required message. The identifier information of the MME connected to the target eNB may be a TAI. The message includes an identifier of the target eNB, a source-to-target transparent container, and the mapped EPS UE context information. The mapped EPS UE context information includes UE mobile management (MM) context information and session SM context information.

If the AMF does not receive information of direct data forwarding path availability from the source NG-RAN, the AMF determines whether indirect data forwarding is feasible. If direct data forwarding is feasible, direct data forwarding is used. The AMF informs the MME whether direct data forwarding or indirect data forwarding. The AMF may also inform the MME of the information of data forwarding being not feasible.

Operation 905: the MME sends a creation session request message to the SGW. The message includes EPS bearer context information.

Operation 906: the SGW sends a creation session response message to the MME. The message includes tunnel information for an S1 interface to send uplink data allocated by the SGW.

Operation 907: the MME sends a handover request message to the E-UTRAN. The message includes a source-to-target transparent container and E-EAB context. The E-RAB context includes the E-RAB to be established and uplink tunnel information of the S1 interface allocated by the SGW. The E-RAB context includes information of whether data forwarding is possible. The message includes the handover type, and the specific content thereof is the same as that in Operation 902, which details are not described herein again.

Operation 908: the E-UTRAN sends a handover request acknowledgement message to the MME. The message includes the established E-RAB list and the E-RAB list failed to be established, as well as the target-to-source transparent container. Corresponding to the established E-RAB, the tunnel information for downlink data transmission of the S1 interface is further included. Corresponding to the established E-RAB, if the source base station proposes the downlink data forwarding, data forwarding is possible, and the target eNB accepts the downlink data forwarding, the target base station includes the tunnel information for data forwarding allocated by the E-UTRAN for each E-RAB accepted for downlink data forwarding.

Operation 909: the MME requests the SGW to create an indirect data forwarding tunnel. This operation is performed only when indirect data forwarding is applied. If the MME receives the downlink tunnel information for data forwarding from the E-UTRAN, the MME requests the SGW to create an indirect data forwarding tunnel. The MME sends the transport layer address and TEID allocated by the eNB for data forwarding to the SGW. The transport layer address and TEID correspond to each E-RAB.

The SGW sends an indirect data forwarding tunnel creation response message to the MME. The message includes the information allocated by the SGW for data forwarding between the SGW and the UPF. The information used for data forwarding between the SGW and the UPF includes an E-RAB identifier and tunnel information used by the E-RAB for data forwarding. The tunnel information includes a transport layer address and a TEID allocated by the SGW. The SGW allocates downlink data forwarding tunnel information for the E-RAB accepted for downlink data forwarding. The SGW allocates uplink data forwarding tunnel information for the E-RAB accepted for uplink data forwarding. The data forwarding tunnel information included in the E-RAB information may include uplink and/or downlink data forwarding tunnel information.

Operation 909 is performed when indirect data forwarding is feasible.

Operation 910: the MME sends a forward relocation response message to the AMF. The message includes tunnel information for data forwarding. For direct data forwarding, the data forwarding tunnel information is received from the target base station by the MME. For indirect data forwarding, the tunnel information is allocated by the SGW and is received by the MME from the SGW. The tunnel information corresponds to each EPS bearer. The tunnel information of data forwarding may include downlink and/or uplink data forwarding tunnel information. The message includes a target-to-source transparent container.

The MME directly sends the E-RAB information to the AMF, and the AMF performs the conversion.

Operation 911: the AMF sends an update SM context request message to the SMF. The message includes the information of direct data forwarding or indirect data forwarding. The AMF requests the SMF to create a data forwarding tunnel. For indirect data forwarding, the AMF requests the SMF to create a data forwarding tunnel. The message includes PDU session information. The PDU session information includes a PDU session identifier, a QoS flow information included in the PDU session, the EPS bearers needing data forwarding in the EPS system in each PDU session, a mapping relationship between a QoS flow and an EPS bearer, an EPS bearer identifier and/or QoS information of the EPS bearer. The message includes tunnel information received from the MME for data forwarding.

Operation 912: the SMF sends an N4 session modification message to the UPF. The message includes PDU session information. The PDU session information includes a PDU session identifier, a QoS flow information included in the PDU session, the EPS bearers needing data forwarding in the EPS system in each PDU session, a mapping relationship between a QoS flow and an EPS bearer, and an EPS bearer identifier and/or QoS information of the EPS bearer. The message includes tunnel information received from the AMF for data forwarding. The message includes the information of direct data forwarding or indirect data forwarding.

The N4 session modification message includes EPS bearer information included in the PDU session. The EPS bearer information includes an EPS bearer identifier and tunnel information used by the EPS bearer for data forwarding. The SMF informs the UPF the correspondence between a QoS flow and an EPS bearer in the PDU session. The UPF knows the QoS flow information of the PDU session in the 5G system. The UPF receives the EPS bearer information and the mapping relationship between a QoS flow and an EPS bearer in the PDU session, from the SMF.

The UPF determines whether the data forwarding tunnel between the NG-RAN node and the UPF is a PDU session tunnel or an E-RAB tunnel. The UPF allocates the tunnel information for data forwarding between the NG-RAN and the UPF and sends the tunnel information to the SMF. If it is determined to use the PDU session tunnel for data forwarding, the UPF allocates the data forwarding tunnel information for the PDU session corresponding to the EPS bearer accepted for data forwarding. If it is determined to use the E-RAB tunnel for data forwarding, the UPF allocates data forwarding tunnel information for the EPS bearer accepted for data forwarding. The tunnel information includes a transport layer address and a TEID.

The UPF sends the allocated tunnel information for data forwarding to the SMF. The SMF receives the N4 session modification response message from the UPF. The message includes tunnel information allocated by the UPF for data forwarding between the NG-RAN and the UPF. For direct data forwarding, the UPF does not need to allocate data forwarding tunnel information. According to the information received in operation 903 or in this operation, the UPF knows whether it is direct data forwarding or indirect data forwarding. For direct data forwarding, operation 912 may also not be performed.

Operation 913: the SMF sends an update SM context response message to the AMF. For direct data forwarding, the message includes tunnel information for data forwarding, received by the SMF from the AMF. The tunnel information is used for direct data forwarding, and is for each EPS bearer. For indirect data forwarding, the message includes tunnel information allocated by the UPF for data forwarding between the NG-RAN and the UPF. The tunnel information may be for each PDU session or each E-RAB.

Operation 914: the AMF sends a handover command message to the NG-RAN. The message includes a target-to-source transparent container, and tunnel information for data forwarding allocated by E-UTRAN or the UPF or SMF. The tunnel information for data forwarding is for each PDU session or each E-RAB. For direct data forwarding, the tunnel information for data forwarding is for each E-RAB for which data forwarding is accepted. For indirect data forwarding, the tunnel information for data forwarding is for each PDU session to which the QoS flow accepted for data forwarding belongs. The message further includes established PDU session information and PDU session information that is not successfully established. The established PDU session information includes the established QoS flow information and the QoS flow information that is note successfully established.

Operation 915: the NG-RAN sends a handover command message to the UE.

The NG-RAN forwards the data.

If the NG-RAN receives the data forwarding tunnel information for each PDU session, the NG-RAN forwards the data to the UPF. The NG-RAN forwards data of QoS flows accepted for data forwarding to the UPF on the tunnel the corresponding PDU session. For the downlink data, the NG-RAN sends downlink packets to the UPF on the tunnel allocated for downlink data forwarding. The UPF forwards the data to the SGW. The UPF adds the QFI corresponding to the QoS flow to the packet header, and forwards the data received from the NG-RAN to the SGW through the user plane tunnel allocated for the mapped EPS bearer. The UPF forwards the data of different QoS flows in the PDU session to the SGW through the user plane tunnel allocated for the mapped EPS bearer according to the mapping relationship between the QoS flow and the EPS bearer. According to the mapping relationship between the QoS flow and the EPS bearer and the EPS bearer information accepted for data forwarding, the UPF knows the QoS flow accepted for data forwarding, and the UPF forwards the data of the QoS flow accepted for data forwarding to the SGW through the user plane tunnel allocated for the mapped EPS bearer. Corresponding to the QoS flow that not accepted for data forwarding, there is no corresponding data forwarding tunnel, and the UPF discards the data.

If the NG-RAN receives the data forwarding tunnel information for each E-RAB, the NG-RAN forwards the data of the QoS flow to the respective E-RAB tunnel. The NG-RAN forwards the PDCP SDU to the respective E-RAB tunnel. The PDCP SDU does not have an SN. For indirect data forwarding, the data is sent to the UPF, and the UPF forwards the data to the SGW. For direct data forwarding, the data is sent directly to the target base station.

The SGW forwards the data to the E-UTRAN. The SGW sends the data received from the tunnel for each EPS bearer from the UPF to the E-UTRAN through the corresponding tunnel allocated by the E-UTRAN. The SGW forwards the data to the E-UTRAN according to the session transmission mode in the EPS.

The E-UTRAN receives the forwarded data from the E-RAB tunnel, and the E-UTRAN first sends the forwarded data to the UE, and then sends the data received from the new S1-U to the UE.

During the establishment of the PDU session or the establishment of the GBR QoS flow, the UE receives the EPS QoS information and/or the EPS bearer identifier information mapped to the QoS flow from the network. The UE associates the ongoing QoS flow and the EPS bearer identifier included in the handover command message to establish a correspondence therebetween. For the QoS flow without corresponding to EPS bearer, the UE may delete it.

Operation 916: the UE sends a handover complete message to the E-UTRAN.

Operation 917: the E-UTRAN sends a handover notify message to the MME. The message includes tunnel information allocated by the E-UTRAN for downlink data transmission.

Operation 918: the MME sends a modification bearer request message to the SGW. The message includes tunnel information used by the S1 interface for downlink data transmission.

Operation 919: the SGW sends a modification bearer request message to the SMF. The SMF may further have the function of the PGW control plane. The SGW allocates tunnel information for downlink data transmission between the SGW and the UPF, wherein the tunnel information corresponds to each EPS bearer or each PDU session.

Operation 920: the SMF request a UPF session modification. The SMF may further have the function of the PGW control plane. The SMF sends the tunnel information for the downlink data transmission between the SGW and the UPF allocated by the SGW to the UPF, wherein the tunnel information corresponds to each EPS bearer or each PDU session. The UPF sends a session modification response to the SMF. The UPF allocates tunnel information for uplink data transmission between the SGW and the UPF, and the UPF sends the tunnel information for the uplink data transmission to the SMF.

Operation 921: the SMF sends a modification bearer response message to the SGW. The message includes tunnel information for uplink data transmission between the SGW and the UPF, which the information is allocated by the UPF.

Operation 922: the SGW sends a modification bearer response message to the MME.

As such, the description of the fifth handover method of the application is completed, and the problem of data forwarding during the UE moving between the EPS and the 5GS system is completely solved by the method, when equipment from different vendors supports different methods for data forwarding, thereby avoiding data loss, ensuring service continuity and interoperability of different equipment from different vendors, and reducing configuration by operator.

Figure 10:
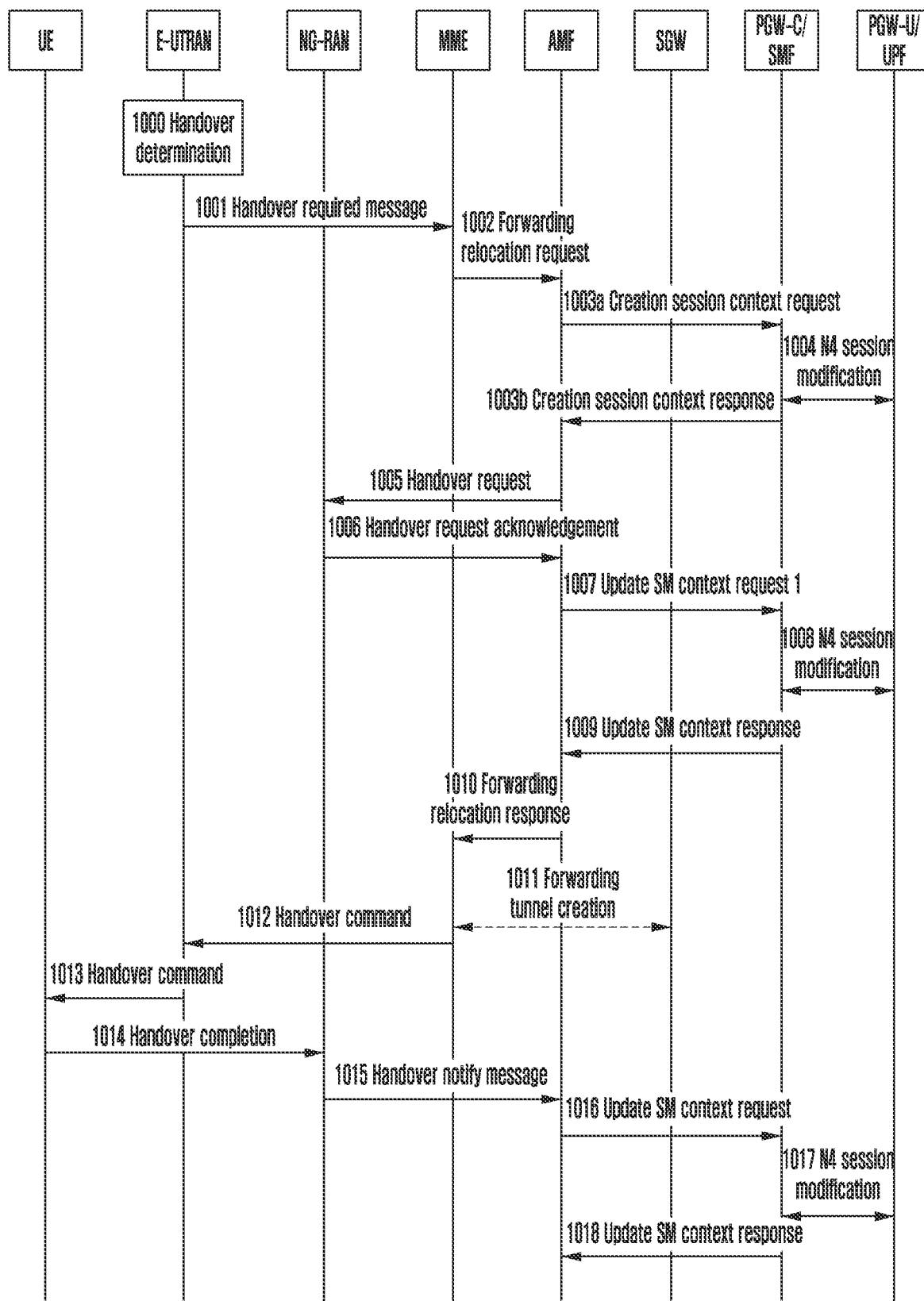
FIG. 10 is a schematic diagram of a sixth method for supporting handover according to an embodiment of the disclosure.

The sixth method for supporting handover in the application is shown as in FIG. 10.

FIG. 10 is a schematic diagram of a sixth method for supporting handover according to an embodiment of the disclosure.

Referring to FIG. 10, this method is applicable to the third manner in which two data forwarding methods coexist, that is, both data forwarding methods are required to be supported. This method is used for handover from 5GS to EPS. Detailed descriptions of operations unrelated to the embodiment are omitted herein. The method includes the operations of:

Operation 1000: the E-UTRAN determines to hand over a UE to an NG-RAN.

Here, the E-UTRAN may be an eNB connected to the EPC. The NG-RAN may be a gNB, or a central unit (CU)

in the eNB or gNB connected to the 5GC. The eNB connected to the 5GC may also be referred to as an ng-eNB.

The user plane path before handover is PGW-U+UPF (the UPF having the function of the PGW user plane, hereinafter referred to as UPF), the SGW to the E-UTRAN. The SGW needs to support the interface to connect with PGW-U+UPF. The UE has one or more PDU sessions in progress. Each PDU session includes one or more EPS bearers. In a PDU session establishment process or an EPS bearer establishment process, the mapped QoS information and/or the QoS flow identifier of the QoS flow are allocated for the EPS bearer. The default EPS bearer is mapped to a non-guaranteed business rate (non-GBR) QoS flow. The QoS information and/or the QoS flow identifier of the QoS flow mapped to the EPS bearer may be allocated by the function of the PCC or the PGW control plane. In order to support handover between different systems, the function of the PGW control plane may further have an SMF function. In the scene of deploying the PCC, the policy control and charging rules function (PCRF) provides the QoS information and/or QoS flow identifier of the QoS flow mapped to the EPS bearer to the SMF. In order to support handover between different systems, the PCRF may also have a policy control function (PCF). The SMF sends the QoS information and/or QoS identifier of the QoS flow mapped to the EPS bearer to the UE through the MME, for example, sending them to the UE through a non-access layer message PDN connection establishment message. During the PDU session establishment process or the EPS bearer establishment process, the SMF may also send the QoS information and/or QoS flow identifier of the QoS flow mapped to the EPS bearer to the E-UTRAN through the MME. The E-UTRAN may send the mapping information to the UE through an RRC message. The E-RAB and EPS bearer identifiers are the same or one-to-one correspondence, which are referred to as an EPS bearer in the core network, and are referred to as an E-RAB in the access network. The E-RAB identifier and the EPS bearer identifier are the same or one-to-one correspondence, which are referred to as an EPS bearer identifier in the core network, and are referred to as an E-RAB identifier in the access network.

Operation 1001: the E-UTRAN sends a handover required message to the MME. The message includes the identifier of the target NG-RAN node, and a source-to-target transparent container. The message also includes identifier information indicating the AMF to which the target NG-RAN node is connected. The identifier information may be a tracking area identifier, a network sharding identifier, an AMF pool identifier, an AMF identifier or the like.

The message includes information of direct data forwarding path availability.

The source-to-target transparent container includes a PDU session identifier, an identifier of the QoS flow in the PDU session, and the downlink data forwarding proposed for the QoS flow. The eNB obtains the PDU session identifier corresponding to the EPS bearer and/or the QoS flow identifier in the PDU session through the PDN connection establishment process or through the handover process. It is also possible to obtain the QoS information of the mapped QoS flow. The eNB determines whether to propose data forwarding according to the E-RAB to PDU session or according to the mapping of the QoS flow in the E-RAB to the PDU session and the QoS information, and the eNB may consider other factors such as whether there is buffered data to determine whether to propose data forwarding, without affecting the main content of the application.

Operation 1002: the MME sends a forward relocation request message to the AMF. The MME selects and finds the AMF according to the identifier information of the AMF to which the target NG-RAN node is connected. The message includes the identifier of the target NG-RAN node, the source-to-target transparent container and the UE context information. The UE context information includes UE mobile management (MM) context information and a session management context. The message includes the handover type.

The MME sends a direct forwarding indication to the AMF. If the MME doesn't receives direct data forwarding path availability from the source E-UTRAN, the MME determines whether indirect data forwarding is possible. The MME informs the AMF of the information of whether direct data forwarding or indirect data forwarding. The MME may also inform AMF of the information of data forwarding being not possible. Data forwarding being not possible means that both direct data forwarding and indirect data forwarding are not possible. Alternatively, the MME sends the information of direct data forwarding path availability to the AMF.

Operation 1003a: the AMF sends a creation session (SM) context request message to the SMF. The AMF converts the received EPS UE context into a 5GS UE context. The AMF may also exchange with the PCRF to obtain the converted 5GS UE context. The AMF selects the SMF that serves the UE.

According to the information received in the forward relocation request message, the AMF knows that the handover is a handover between different systems, and the AMF requests the SMF to provide the SM context. The AMF sends the message to each SMF serving the UE.

The AMF sends the direct forwarding indication to the SMF, and the AMF informs the SMF of the information that direct data forwarding or indirect data forwarding is available.

The AMF informs the SMF of the information of direct data forwarding or indirect data forwarding or data forwarding being not feasible. The AMF may further inform the SMF of the information that direct data forwarding is available.

Operation 1004: the SMF initiates an N4 session modification process between it and the UPF. The SMF informs the UPF of the information of whether direct data forwarding or indirect data forwarding. The SMF may also inform the UPF of the information that data forwarding is not possible. The SMF may also inform the UPF of the information that direct data forwarding is available.

Operation 1003b: the SMF sends a creation session context response message to the AMF. The message includes the SM context of the UE. The SM context also includes a mapping relationship between an EPS bearer and a QoS flow in the PDU session. If the SMF has the mapped EPS bearer context, the SMF always feeds back the mapped EPS bearer context together with the SM context to the AMF at the same time when the AMF requests the SM context. Alternatively, the SMF sends the mapped EPS bearer context to the AMF when the AMF requests the mapped EPS context at the same time.

The 5GS UE context includes QoS information in the 5G system. The QoS information in the 5G system includes a QoS rule and/or a QoS profile. The AMF may map EPS QoS information into 5G QoS information, or the AMF interacts with the 5G policy control function (5G-PCF) to derive 5G QoS information.

The SMF determines direct data forwarding, indirect data forwarding, or data forwarding not possible. If the direct forwarding indication received by the SMF indicates that direct data forwarding is available, the SMF determines to use direct data forwarding. If the direct forwarding indication received by the SMF indicates indirect data forwarding and that indirect data forwarding is possible, the SMF determines to use indirect data forwarding. If the direct forwarding indication received by the SMF indicates indirect data forwarding but no indirect data forwarding connectivity, the SMF determines that data forwarding is not possible. The SMF includes information of direct data forwarding, indirect data forwarding, or data forwarding being not possible in the N2 session management (SM) information container. Direct data forwarding information may be information of direct data forwarding path availability. Data forwarding being not possible means that indirect data forwarding is not possible or both direct and indirect data forwarding are not possible.

The SMF determines that indirect data forwarding or data forwarding is not feasible. The SMF informs the target NG-RAN of the information. Or,
 the SMF determines whether indirect data forwarding is not possible. The SMF informs the target NG-RAN of the information that indirect data forwarding is not possible and whether direct data forwarding is available.

Operation 1005: the AMF sends the handover request message to the NG-RAN. The message includes information of the PDU session to be established. The information of the PDU session includes a session identifier, session QoS information, QoS flow information, uplink tunnel information for each session, and/or a source-to-target transparent container. The message includes the type of handover.

The message includes the information of direct data forwarding, indirect data forwarding, or data forwarding being not possible. The above information may be included in a N2 SM information container. Direct data forwarding information may be information of direct data forwarding path availability. Data forwarding being not possible means that indirect data forwarding is not possible or both direct and indirect data forwarding are not possible. The message may also include a mapping relationship between a QoS flow and an EPS bearer in the PDU session, that is, the E-RAB identifier mapped by the QoS flow and/or the mapped QoS information.

Operation 1006: the NG-RAN sends a handover request acknowledgement message to the AMF. The message includes one or more of the following information:
1) the target-to-source transparent container. The target-to-source transparent container may further include a mapping relationship between a QoS flow and an EPS bearer in the PDU session, that is, the EPS bearer identifier mapped by the QoS flow and/or the mapped QoS information.
2) the established PDU session information list accepted by the NG-RAN. The PDU session information list includes a PDU session identifier, downlink tunnel information of the NG3 interface used for the PDU session, QoS flow information accepted by the PDU session, and unaccepted QoS flow information.

The NG-RAN determines whether the data forwarding tunnel is for each PDU session or each E-RAB. If direct data forwarding is feasible, the NG-RAN may determine to use the E-RAB tunnel for data forwarding, and the handover request acknowledgement message includes the E-RAB identifier and the downlink tunnel information for the E-RAB allocated by the NG-RAN. If it is indirect data forwarding, the NG-RAN determines whether the tunnel used for data forwarding between the NG-RAN and the UPF is for each PDU session or each E-RAB. If it is determined to use the PDU session tunnel for data forwarding, the NG-RAN allocates data forwarding tunnel information for the PDU session to which the QoS flow accepted for data forwarding belongs, and the handover request acknowledgement message includes the PDU session identifier and the downlink tunnel information corresponding to the PDU session allocated by the NG-RAN, and may further include a QoS flow list accepted for data forwarding. If it is determined to use the E-RAB tunnel for data forwarding, the NG-RAN allocates data forwarding tunnel information for the E-RAB corresponding to the QoS flow or the E-RAB accepted for data forwarding, and the handover request acknowledgement message includes the E-RAB identifier and the downlink tunnel information for the E-RAB allocated by the NG-RAN. The tunnel information includes a transport layer address and a TEID. The NG-RAN sends the allocated data forwarding tunnel information to the AMF. If data forwarding is not possible, the NG-RAN does not need to allocate data forwarding tunnel information. For direct data forwarding, only E-RAB tunnel for data forwarding may be used.

3) the PDU session information list failed to be setup by the NG-RAN. The PDU session information list includes the PDU session identifier and the reason for not accepting.

Operation 1007: the AMF sends an update SM context request message to the SMF. If tunnel information for data forwarding is received from the NG-RAN, the AMF sends the data forwarding tunnel information received from the NG-RAN to the SMF. The AMF sends the tunnel information received from the NG-RAN for data forwarding to the SMF. The AMF sends the information of whether it is direct data forwarding or indirect data forwarding to the SMF. The AMF may inform SMF of direct data forwarding, indirect data forwarding or data forwarding in an explicit manner. The AMF may also inform the SMF of direct data forwarding or indirect data forwarding in an implicit manner, that is, if the tunnel used for data forwarding is a PDU session, it is indirect data forwarding, and if it is the tunnel information of the EPS bearer, it is direct data forwarding. If no data forwarding tunnel information is received, data forwarding is not feasible or data forwarding is not accepted by the target base station. The message includes a PDU session to which the EPS bearer belongs. The message may also include a mapping relationship between an EPS bearer and a QoS flow in the PDU session.

Operation 1008: the SMF initiates a session modification process between it and the UPF. The SMF sends the information of whether direct data forwarding or indirect data forwarding to the UPF. The SMF sends the NG3 interface downlink data forwarding tunnel information allocated by the NG-RAN to the UPF through the N4 session modification process, wherein the data forwarding tunnel information corresponds to each PDU session or each EPS bearer. The SMF allocates the data forwarding tunnel information between the SGW and the UPF, or the UPF allocates the tunnel information for data forwarding between the SGW and the UPF and sends the tunnel information to the SMF, wherein the data forwarding tunnel information is for each E-RAB. The N4 session modification message includes a PDU session to which the EPS bearer belongs. The N4 session establishment or N4 session modification message may further include a mapping relationship between an EPS bearer and a QoS flow in the PDU session. For direct data forwarding, the SMF or UPF does not need to allocate the data forwarding tunnel information. According to the information received in operation 1003 or in this operation, the UPF knows whether it is direct data forwarding or indirect data forwarding. Corresponding to the implicit manner, if the SMF receives the data forwarding tunnel information for each E-RAB, it is direct data forwarding.

Operation 1009: the SMF sends an update SM context response message to the AMF. The SMF sends the tunnel information for data forwarding to the AMF. Corresponding to direct data forwarding, the SMF sends the tunnel information for each E-RAB received from the AMF to the AMF, and the tunnel information for each E-RAB is allocated by the target NG-RAN. Corresponding to indirect data forwarding, the SMF sends the tunnel information for each E-RAB allocated by the SMF or UPF to the AMF, and the tunnel information is used for data forwarding between the SGW and the UPF.

Operation 1010: the AMF sends a forward relocation response message to the MME. The message includes data forwarding tunnel information. For direct data forwarding, the tunnel information is allocated by the target NG-RAN. For indirect data forwarding, the tunnel information is tunnel information received from the SMF for data forwarding between the SGW and the UPF. The message includes a target-to-source transparent container.

Operation 1011: the MME sends a creating indirect data forwarding tunnel request message to the SGW for indirect data forwarding, if the MME receives the tunnel information for data forwarding. The message is used to send tunnel information for data forwarding between the SGW and the UPF to the SGW. The SGW sends a creating indirect data forwarding tunnel response message to the MME. The message includes uplink tunnel information allocated by the SGW for data forwarding over the S1 interface. For direct data forwarding, this operation is not required to be performed. The MME knows whether it is direct data forwarding or indirect data forwarding according to the information of direct forwarding path availability received from the source base station, as described in operation 1002.

Operation 1012: the MME sends a handover command message to the E-UTRAN. The message includes a target-to-source transparent container. The message includes the type of handover.

The message includes data forwarding tunnel information. For indirect data forwarding, the tunnel information is allocated by the SGW. For direct data forwarding, the tunnel information is allocated by the target NG-RAN.

Operation 1013: the E-UTRAN sends a handover command message to the UE.

The message may also include a mapping relationship between a QoS flow and an EPS bearer in the PDU session, that is, the EPS bearer identifier and/or the mapped QoS information mapped by the QoS flow.

The E-UTRAN forwards data. For the E-RAB for which the data forwarding tunnel information is received, it indicates that the target base station accepts data forwarding, and the E-UTRAN forwards the data to the corresponding tunnel. For direct data forwarding, the target NG-RAN directly receives the data forwarded by the E-UTRAN. For indirect data forwarding, the SGW receives the data forwarded by the E-UTRAN. The SGW forwards the data to the UPF. The SGW forwards data to the UPF for each EPS bearer accepted for data forwarding on the corresponding tunnel. The UPF forwards the data to the NG-RAN. The UPF forwards the data to the NG-RAN through the corresponding tunnel according to the data forwarding tunnel information allocated by the NG-RAN received in operation 1008. If the received tunnel is for each PDU session, the UPF sends the data, belonging to the same PDU session, received from the SGW on the tunnel for each EPS bearer to the NG-RAN through the PDU session tunnel, that is, the UPF performs mapping of multiple tunnels to one tunnel. The UPF forwards data to the NG-RAN according to the session transmission manner in the 5GS, for example, through which several QoS flows to send downlink data in each PDU session, and how to set the header of the QoS flow. The UPF adds a QoS flow identifier (QFI) to the packet header forwarded to the target NG-RAN. If the received tunnel is for each E-RAB, the UPF directly forwards the data to the corresponding E-RAB tunnel.

The NG-RAN receives the forwarded data from a PDU session tunnel, and the NG-RAN sends the received data to the UE according to an existing manner. The NG-RAN receives the forwarded data from an E-RAB tunnel, and the NG-RAN directly sends the data to the PDCP layer of the corresponding DRB with no need for SDAP layer processing. Based on the mapping relationship between an E-RAB ID(s) and a QoS Flow ID(s) received in the handover request message, the NG-RAN knows the DRB corresponding to the E-RAB, and directly sends the received forwarded data to the PDCP entity of the corresponding DRB. The NG-RAN first sends the forwarded data to the UE, and then sends the data received from a new NG-U to the UE.

During the establishment of the PDU session or the establishment of the EPS bearer, the UE receives the QoS information of the QoS flow mapped by the EPS bearer and/or the QoS flow information from the network. The UE establishes the correspondence between the ongoing EPS bearer and the QoS flow included in the handover command message. For an EPS bearer that does not have a corresponding QoS flow, the UE may delete it.

Alternatively, the UE obtains the mapping relationship between a QoS flow and an EPS bearer in the PDU session from the handover command message. The UE establishes the correspondence between the ongoing EPS bearer and the QoS flow included in the handover command message. For an EPS bearer that does not have a corresponding QoS flow, the UE may delete it.

Operation 1014: the UE sends a handover complete message to the NG-RAN.

Operation 1015: the NG-RAN sends a handover notify message to the AMF. The message includes the tunnel information allocated by the NG-RAN for downlink data transmission.

Operation 1016: the AMF sends an update SM context request message to the SMF.

Operation 1017: the SMF sends a N4 session modification message to the UPF. The UPF sends the N4 session modification response message to the SMF.

The AMF sends the tunnel information allocated by the NG-RAN for downlink data transmission to the UPF through the AMF.

Operation 1018: the SMF sends an update SMF context response message to the AMF.

As such, the description of the sixth handover method of the application is completed, and the problem of data forwarding during the UE moving between the EPS and the 5GS system is completely solved by the method, when equipment from different vendors support different methods for data forwarding, thereby avoiding data loss, ensuring service continuity and interoperability of different equipment from different vendors, and reducing configuration by operator.

Based on the same concept, an embodiment of the application provides an equipment, wherein the equipment may be any one of the foregoing equipment, for example, a source base station, a source core network, a target core network, a target base station, a UPF, an SMF, an AMF, an NG-RAN node, and the equipment includes: a transceiver and a processor, The transceiver is configured to send and receive signals;

The processor is configured to perform the method performed by any one of the foregoing equipment.

Based on the same concept, an embodiment of the application provides a computer readable storage medium having a computer program stored thereon, and implementing, when the program is executed by a processor, the method shown in the above described embodiments.

In particular, those skilled in the art will appreciate that the application includes equipment for performing one or more of the operations described herein, including a full-duplex transceiver and an electronic device. These may be specially designed and manufactured for required purposes, or may also include known devices in a general-purpose computer. This equipment has computer programs stored therein that are selectively activated or reconfigured. Such computer programs may be stored in a device (e.g., a computer) readable medium or in any type of medium suitable for storing electronic instructions and respectively coupling to a bus, including but not limited to, any types of disks (including floppy disks, hard disk, optical disks, CD-ROMs, and magnetic-optical disks), read-only memory (ROM), random access memory (RAM), erasable programmable ROM (EPROM), electrically erasable programmable ROM (EEPROM), flash memory, magnetic or optical cards. That is, the readable medium includes any medium in which the information is stored or sent by a device (e.g., a computer) in a readable form.

The embodiment of the application provides a computer readable storage medium suitable for the foregoing method embodiments, which will not be repeated herein.

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other sequences. Moreover, at least some of the steps in the flowchart of the drawings may include a plurality of sub-steps or stages, which are not necessarily performed at the same time, but may be executed at different times, and the order of execution thereof is not necessarily to be performed sequentially, but may be performed alternately or alternately with at least a portion of the sub-steps or stages of other steps or other steps.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a session management function (SMF) in a mobile communication system, the method comprising:

obtaining information on a data forwarding in an evolved packet system (EPS)-to-5th generation system (5GS) handover;

generating N2 session management (SM) information which is transparent to an access and mobility management function (AMF), the N2 SM information indicating that the data forwarding is not possible or whether a direct forwarding path for the data forwarding is available, based on the information on the data forwarding; and transmitting a message for providing a created SM context towards a new generation-radio access network (NG-RAN) node, wherein the N2 SM information is included in the message for providing the created SM context.

2. The method of claim 1, wherein the N2 SM information is used to allocate a tunnel for the data forwarding.

3. The method of claim 2, in case that an indirect data forwarding is applied according to the N2 SM information, the tunnel is allocated per protocol data unit (PDU) session associated with at least one quality of service (QOS) flow for the data forwarding.

4. The method of claim 2, in case that a direct data forwarding is applied according to the N2 SM information, the tunnel is allocated per evolved-universal mobile telecommunications system (UMTS) terrestrial radio access network (E-UTRAN) radio access bearer (E-RAB) for the data forwarding.

5. The method of claim 1, wherein the N2 SM information includes mapping information between at least one evolved-universal mobile telecommunications system (UMTS) terrestrial radio access network (E-UTRAN) radio access bearer (E-RAB) identifier and at least one quality of service (QOS) flow identifier.

6. A method performed by an access and mobility management function (AMF) in a mobile communication system, the method comprising:

obtaining a message for providing a created session management (SM) context, wherein the message for providing the created SM context includes N2 SM information generated by a session management function (SMF) and, the N2 SM information is transparent to the AMF;

transmitting, to a new generation-radio access network (NG-RAN) node, a handover request message including the N2 SM information; and receiving, from the NG-RAN node, a handover request acknowledgement message including information on a tunnel allocated for a data forwarding in an evolved packet system (EPS)-to-5th generation system (5GS) handover, wherein the N2 SM information indicates that the data forwarding is not possible or whether a direct forwarding path for the data forwarding is available.

7. The method of claim 6, wherein the tunnel allocated for the data forwarding is based on the N2 SM information.

8. The method of claim 7, in case that an indirect data forwarding is applied according to the N2 SM information, the tunnel is allocated per protocol data unit (PDU) session associated with at least one quality of service (QOS) flow for the data forwarding.

9. The method of claim 7, in case that a direct data forwarding is applied according to the N2 SM information, the tunnel is allocated per evolved-universal mobile telecommunications system (UMTS) terrestrial radio access network (E-UTRAN) radio access bearer (E-RAB) for the data forwarding.

10. The method of claim 6, wherein the N2 SM information includes mapping information between at least one evolved-universal mobile telecommunications system (UMTS) terrestrial radio access network (E-UTRAN) radio access bearer (E-RAB) identifier and at least one quality of service (QOS) flow identifier.

11. A session management function (SMF) in a mobile communication system, the SMF comprising:
- a transceiver; and
- a controller coupled with the transceiver and configured to:
  - obtain information on a data forwarding in an evolved packet system (EPS)-to-5th generation system (5GS) handover,
  - generate N2 session management (SM) information which is transparent to an access and mobility management function (AMF), the N2 SM information indicating that the data forwarding is not possible or whether a direct forwarding path for the data forwarding is available, based on the information on the data forwarding, and
  - transmit a message for providing a created SM context towards a new generation-radio access network (NG-RAN) node, wherein the N2 SM information is included in the message for providing the created SM context.

12. The SMF of claim 11, wherein the N2 SM information is used to allocate a tunnel for the data forwarding.

13. The SMF of claim 12, in case that an indirect data forwarding is applied according to the N2 SM information, the tunnel is allocated per protocol data unit (PDU) session associated with at least one quality of service (QOS) flow for the data forwarding.

14. The SMF of claim 12, in case that a direct data forwarding is applied according to the N2 SM information, the tunnel is allocated per evolved-universal mobile telecommunications system (UMTS) terrestrial radio access network (E-UTRAN) radio access bearer (E-RAB) for the data forwarding.

15. The SMF of claim 11, wherein the N2 SM information includes mapping information between at least one evolved-universal mobile telecommunications system (UMTS) terrestrial radio access network (E-UTRAN) radio access bearer (E-RAB) identifier and at least one quality of service (QOS) flow identifier.

16. An access and mobility management function (AMF) in a mobile communication system, the AMF comprising:
- a transceiver; and
- a controller coupled with the transceiver and configured to:
  - obtain a message for providing a created session management (SM) context, wherein the message for providing the created SM context includes N2 SM information generated by a session management function (SMF) and the N2 SM information is transparent to the AMF,
  - transmit, to a new generation-radio access network (NG-RAN) node, a handover request message including the N2 SM information, and
  - receive, from the NG-RAN node, a handover request acknowledgement message including information on a tunnel allocated for a data forwarding in an evolved packet system (EPS)-to-5th generation system (5GS) handover,
- wherein the N2 SM information indicates that the data forwarding is not possible or whether a direct forwarding path for the data forwarding is available.

17. The AMF of claim 16, wherein the tunnel allocated for the data forwarding is based on the N2 SM information.

18. The AMF of claim 17, in case that an indirect data forwarding is applied according to the N2 SM information, the tunnel is allocated per protocol data unit (PDU) session associated with at least one quality of service (QOS) flow for the data forwarding.

19. The AMF of claim 17, in case that a direct data forwarding is applied according to the N2 SM information, the tunnel is allocated per evolved-universal mobile telecommunications system (UMTS) terrestrial radio access network (E-UTRAN) radio access bearer (E-RAB) for the data forwarding.

20. The AMF of claim 16, wherein the N2 SM information includes mapping information between at least one evolved-universal mobile telecommunications system (UMTS) terrestrial radio access network (E-UTRAN) radio access bearer (E-RAB) identifier and at least one quality of service (QOS) flow identifier.

* * * * *